(12) United States Patent
Shimosato

(10) Patent No.: US 10,165,191 B2
(45) Date of Patent: Dec. 25, 2018

(54) IMAGE PICKUP APPARATUS HAVING ZOOM FUNCTION, METHOD OF CONTROLLING THE SAME, AND STORAGE MEDIUM

(71) Applicant: CANON KABUSHIKI KAISHA, Tokyo (JP)

(72) Inventor: Jiro Shimosato, Tokyo (JP)

(73) Assignee: Canon Kabushiki Kaisha, Tokyo (JP)

(*) Notice: Subject to any disclaimer, the term of this patent is extended or adjusted under 35 U.S.C. 154(b) by 41 days.

(21) Appl. No.: 15/284,644

(22) Filed: Oct. 4, 2016

(65) Prior Publication Data
US 2017/0104938 A1 Apr. 13, 2017

(30) Foreign Application Priority Data
Oct. 9, 2015 (JP) ................. 2015-200960

(51) Int. Cl.
*H04N 5/262* (2006.01)
*H04N 5/232* (2006.01)

(52) U.S. Cl.
CPC ..... *H04N 5/23296* (2013.01); *H04N 5/23251* (2013.01); *H04N 5/23293* (2013.01)

(58) Field of Classification Search
CPC combination set(s) only.
See application file for complete search history.

(56) References Cited

U.S. PATENT DOCUMENTS

| 9,578,251 B2 * | 2/2017 | Tsubusaki | H04N 5/23296 |
| 2017/0094184 A1 * | 3/2017 | Gao | H04N 5/23296 |

FOREIGN PATENT DOCUMENTS

| JP | 2009-088860 A | 4/2009 |
| JP | 2012-060595 A | 3/2012 |

* cited by examiner

*Primary Examiner* — Gary C Vieaux
(74) *Attorney, Agent, or Firm* — Venable LLP

(57) ABSTRACT

An image pickup apparatus that, even when an object is framed-out to be undetectable, is capable of assisting framing with comfort by quick recapturing of the object within the angle of view. A specific object is detected from a live view image picked up by an image pickup device. Movement of the image pickup apparatus is detected, and a zoom operation is performed according to an amount of the detected movement of the image pickup apparatus. When predetermined conditions are satisfied which include a condition that a direction of the movement of the detected object is the same as a direction of the detected movement of the image pickup apparatus, FA zoom control is performed such that the FA zoom operation according to an amount of movement of the image pickup apparatus is restricted.

17 Claims, 23 Drawing Sheets

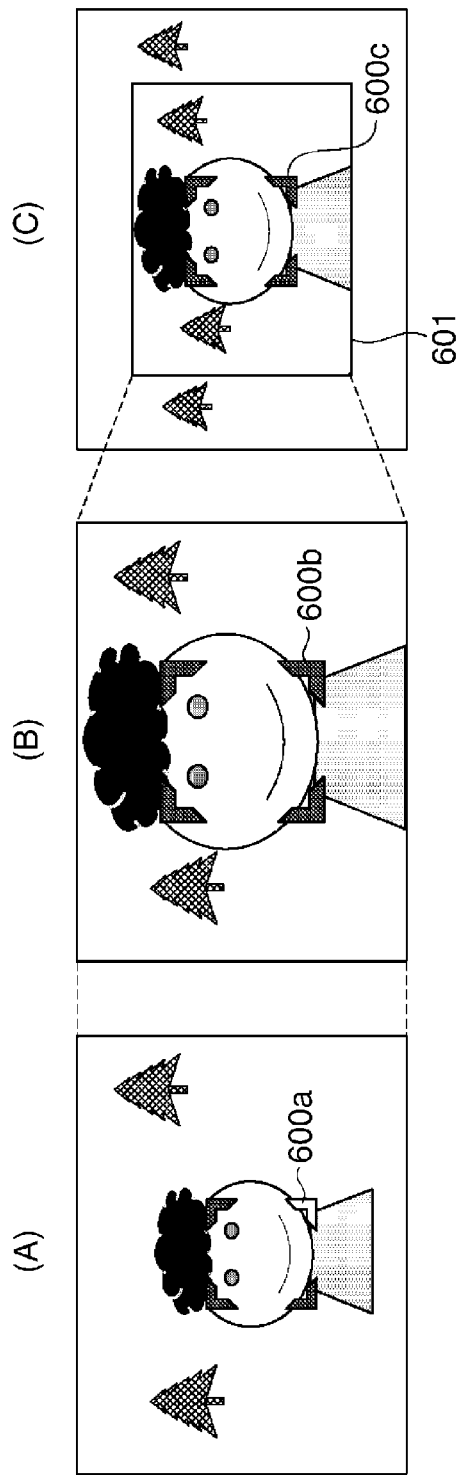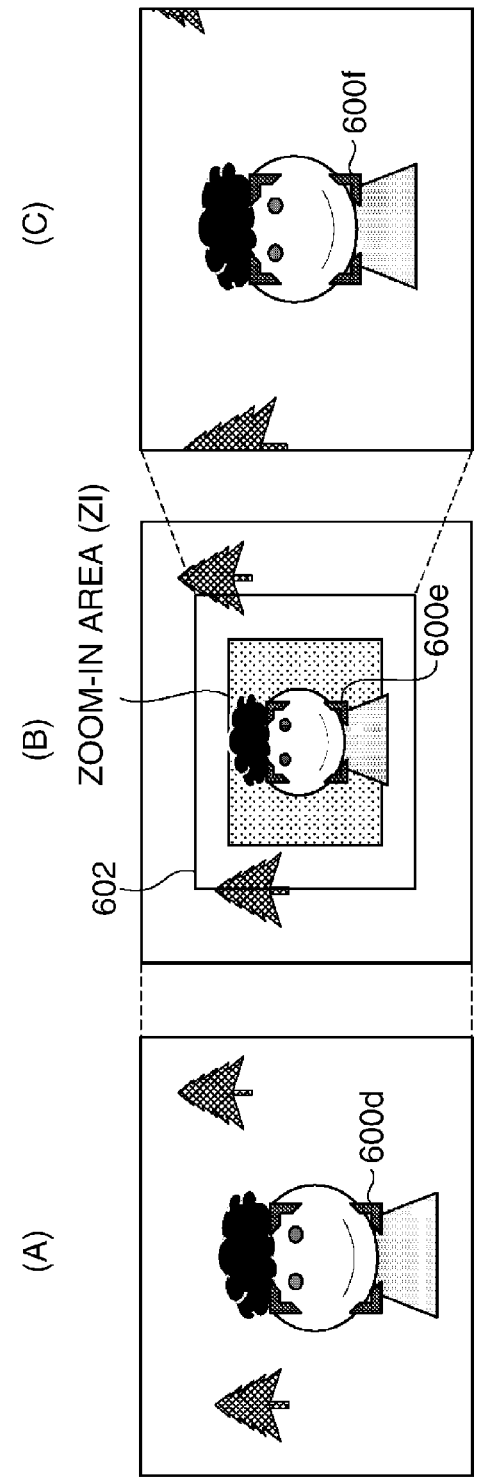

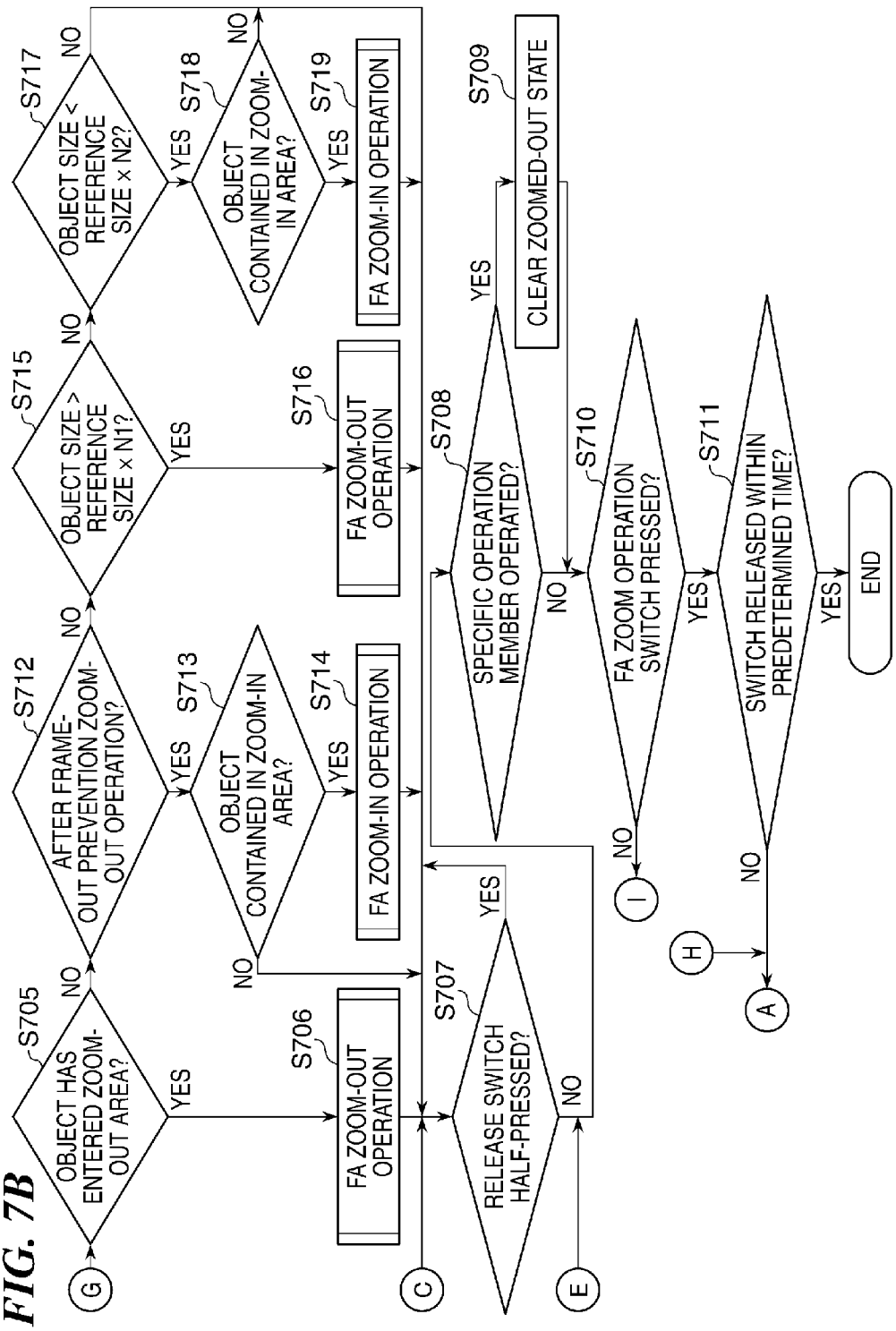

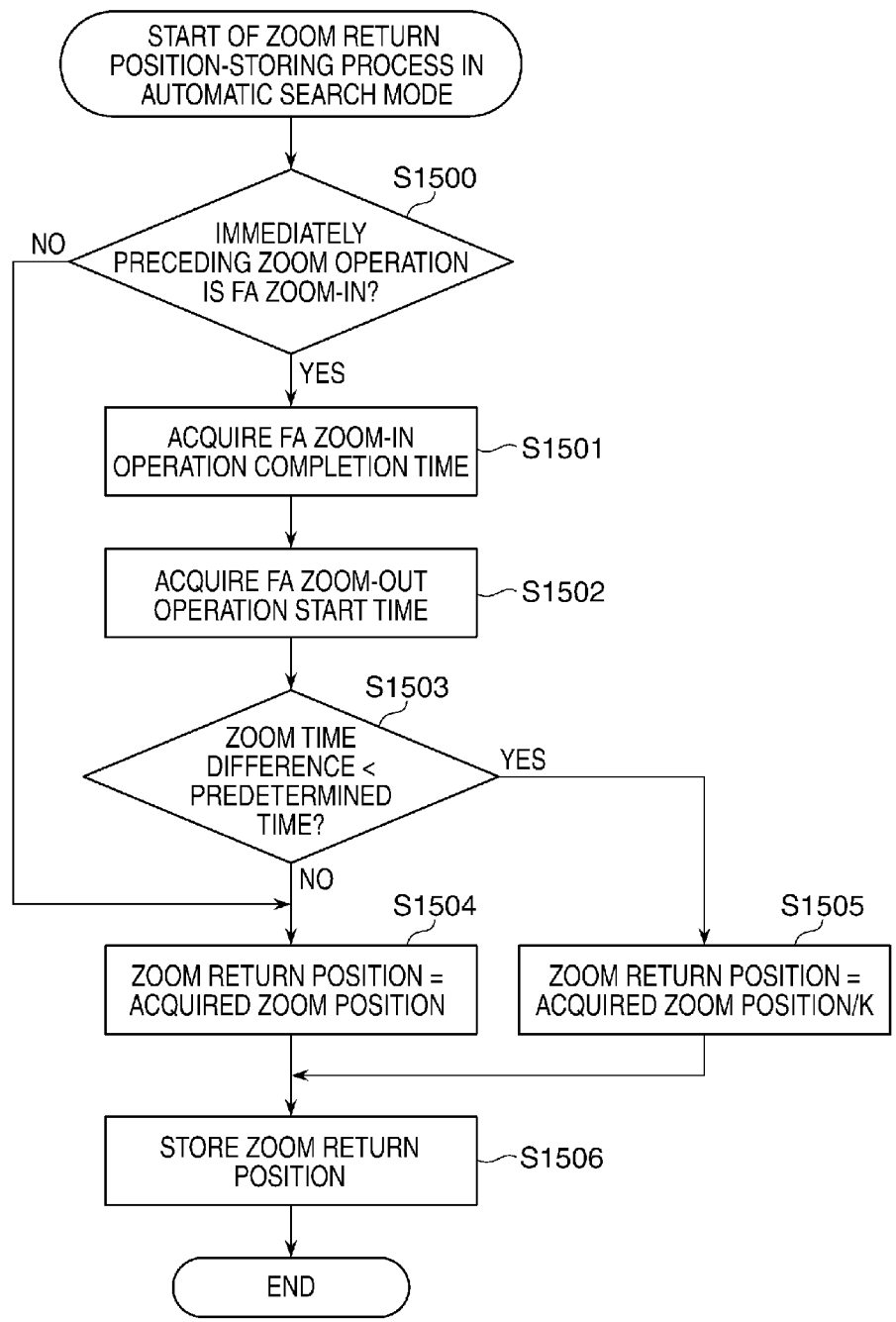

IMAGE PICKUP APPARATUS HAVING ZOOM FUNCTION, METHOD OF CONTROLLING THE SAME, AND STORAGE MEDIUM

BACKGROUND OF THE INVENTION

Field of the Invention

The present invention relates to an image pickup apparatus having a zoom function, a method of controlling the same, and a storage medium, and more particularly to an image pickup apparatus that is capable of more quickly capturing an object within an angle of view using the zoom function.

Description of the Related Art

In general, there has been known an image pickup apparatus having a function of performing optical magnification processing (optical zoom) by driving a zoom lens and a function of performing electronic magnification processing (electronic zoom) by enlarging part of a picked-up image. Further, in view of the fact that an object is ready to be framed-out during image pickup in a telephoto state, there has been proposed an image pickup apparatus having a framing assist zoom function (FA zoom function) so as to enable quick capturing of an object having been framed-out (see Japanese Patent Laid-Open Publication No. 2012-60595). In the image pickup apparatus described in Japanese Patent Laid-Open Publication No. 2012-60595, when the start of the FA zoom function is instructed, the image is zoomed out in a wide-angle direction, whereas when the termination of the FA zoom function is instructed, the image is zoomed in such that the zoom position at the time of the start of the FA zoom function is reached.

Further, there has been proposed an image pickup apparatus which is equipped with an automatic zoom function for zoom-out of a photographic range including an object, when it is determined, based on a result of detection of the object and acceleration of the image pickup apparatus, that the object is out of the angle of view (see Japanese Patent Laid-Open Publication No. 2009-88860).

In the FA zoom function described in Japanese Patent Laid-Open Publication No. 2012-60595, zoom-out or zoom-in processing is performed according to the operation of a photographer. In doing this, if the zoom operation can be automatically performed according to the state of the object also in the FA zoom function, it is possible to increase the convenience of a photographer. On the other hand, in the automatic zoom function described in Japanese Patent Laid-Open Publication No. 2009-88860, if an object is out of the angle of view, zoom-out processing is necessarily performed, and hence a user sometimes misses a photographic opportunity due to zoom-out processing performed at a timing which is not intended by the user.

SUMMARY OF THE INVENTION

The present invention provides an image pickup apparatus that, even when an object is framed-out to be undetectable, is capable of assisting framing with comfort by quick recapturing of the object within the angle of view, a method of controlling the same, and a storage medium.

In a first aspect of the present invention, there is provided an image pickup apparatus comprising an image pickup unit, an object detection unit configured to detect a specific object from a live view image picked up by the image pickup unit, a movement detection unit configured to detect movement of the image pickup apparatus, a zoom control unit configured to perform control such that a zoom operation is performed according to an amount of movement of the image pickup apparatus detected by the movement detection unit, and a control unit configured to perform control such that the zoom operation performed by the zoom control unit according to the amount of movement of the image pickup apparatus is restricted, in a case where predetermined conditions are satisfied which include a condition that a direction of the movement of the object detected by the object detection unit is the same as a direction of the movement of the image pickup apparatus detected by the movement detection unit.

In a second aspect of the present invention, there is provided a method of controlling an image pickup apparatus including an image pickup unit, comprising detecting a specific object from a live view image picked up by the image pickup unit, detecting movement of the image pickup apparatus, performing control such that a zoom operation is performed according to an amount of detected movement of the image pickup apparatus, and performing control such that the zoom operation according to the amount of detected movement of the image pickup apparatus is restricted, in a case where predetermined conditions are satisfied which include a condition that a direction of movement of the detected object is the same as a direction of the detected movement of the image pickup apparatus.

In a third aspect of the present invention, there is provided a non-transitory computer-readable storage medium storing a computer-executable program for executing a method of controlling an image pickup apparatus including an image pickup unit, wherein the method comprises detecting a specific object from a live view image picked up by the image pickup unit, detecting movement of the image pickup apparatus, performing control such that a zoom operation is performed according to an amount of detected movement of the image pickup apparatus, and performing control such that the zoom operation according to the amount of detected movement of the image pickup apparatus is restricted, in a case where predetermined conditions are satisfied which include a condition that a direction of movement of the detected object is the same as a direction of the detected movement of the image pickup apparatus.

According to the present invention, even when an object is framed-out to be undetectable, it is possible to assist framing with comfort by quick recapturing of the object within the angle of view. Note that, throughout the specification, the fact that an object comes into the screen is referred to as "frame-in", and is described as "the object is framed-in." On the other hand, the fact that an object goes out of the screen is referred to as "frame-out", and is described as "the object is framed-out." Further, adjustment of the relationship between a photographing target including an object and the screen is referred to as "framing".

Further features of the present invention will become apparent from the following description of exemplary embodiments (with reference to the attached drawings).

BRIEF DESCRIPTION OF THE DRAWINGS

FIGS. 6A and 6B are diagrams useful in explaining zoom operations performed by the camera shown in FIG. 1, in which FIG. 6A shows a zoom operation performed when a person as an object moves toward the camera, and FIG. 6B shows a zoom operation performed when a person as an object moves away from the camera.

FIG. 7B is a continuation of FIG. 7A.

FIGS. 10A to 10C are diagrams each showing an example of a setting screen used by the camera shown in FIG. 1, in which FIG. 10A shows a photographing standby screen, FIG. 10B shows a screen displayed when a strobe button is pressed, and FIG. 10C shows a screen displayed when a function (FUNC) button is pressed.

FIG. 15 is a flowchart of a zoom return position-storing process performed in an automatic search mode in a step in FIG. 12A.

FIGS. 17A to 17C are diagrams useful in explaining an example of a screen displayed on the display section when a movement of the camera shown in FIG. 1 is large, in which FIG. 17A shows an example of an image displayed on the display section, FIG. 17B shows an image displayed when a predetermined time period has elapsed from when the image is in the state shown in FIG. 17A, and FIG. 17C shows an image displayed when a predetermined time period has elapsed from when the image is in the state shown in FIG. 17B.

DESCRIPTION OF THE EMBODIMENTS

The present invention will now be described in detail below with reference to the accompanying drawings showing embodiments thereof.

Figure 1:
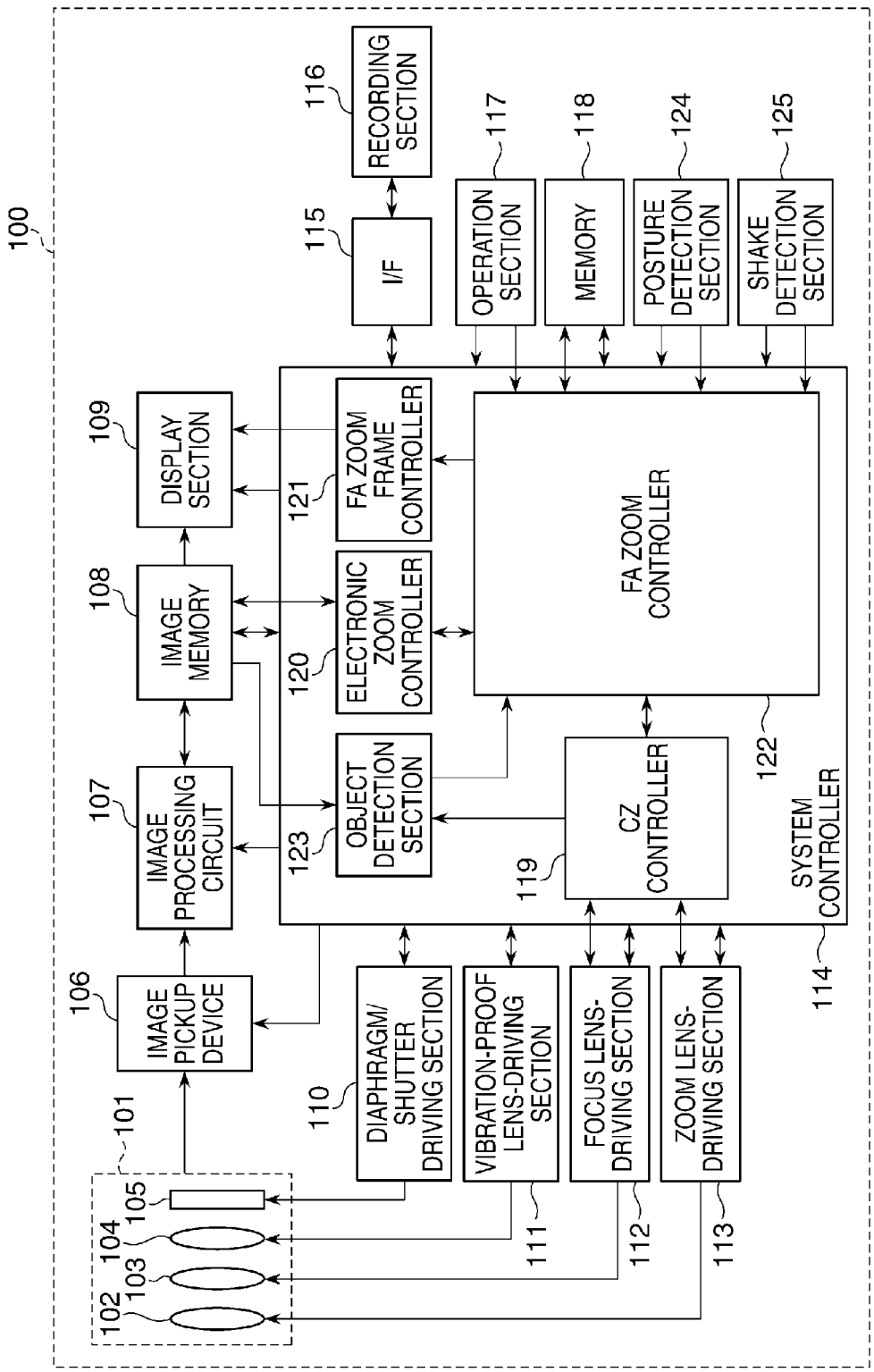
FIG. 1 is a block diagram of a digital camera as an image pickup apparatus according to an embodiment of the present invention.

FIG. 1 is a block diagram of an image pickup apparatus according to an embodiment of the present invention.

The illustrated image pickup apparatus is, for example, a digital camera (hereinafter simply referred to as the camera), and the camera, denoted by reference numeral 100, has a framing assist (FA) zoom function (hereinafter referred to as the FA zoom function) for performing framing assist zoom for assisting a user to perform framing.

The camera 100 includes a lens barrel 101, and a lens group is held by the lens barrel 101. The lens group includes a zoom lens 102, a focus lens 103, and a vibration-proof lens 104, for example. By moving the zoom lens 102 along the optical axis, the focal length is adjusted to thereby optically change the angle of view (move the zoom position). Further, the focus lens 103 is moved along the optical axis to thereby adjust the focus. The vibration-proof lens 104 is a correction lens for correcting image shake caused by camera shake.

A diaphragm and shutter 105 is disposed at a location downstream of the vibration-proof lens 104, and an amount of incident light is adjusted by the diaphragm and shutter 105, whereby exposure control is performed. Although in the illustrated camera 100, the lens barrel 101 and a camera main body are integrally constructed, this is not limitative. For example, the present invention can also be applied to a camera including a camera body and an interchangeable lens which is removably mounted the camera main body.

An optical image is formed on an image pickup device 106 including a CCD (charge coupled device) or a CMOS (complementary metal-oxide-semiconductor) sensor via the lens barrel 101. The image pickup device 106 converts the optical image to electric signals by photoelectric conversion, and sends image pickup signals (image signals) obtained by converting the electric signals from analog to digital to an image processing circuit 107.

The image processing circuit 107 performs predetermined image processing on the image pickup signals, such as pixel interpolation and color conversion, to thereby obtain image data. Then, the image processing circuit 107 outputs the image data to an image memory 108. The image memory 108 is a storage section implemented by a DRAM (Dynamic Random Access Memory) or an SRAM (Static Random Access Memory).

A display section 109 includes a TFT LCD (thin-film transistor drive liquid crystal display) and so forth, and displays a live view image corresponding to image data. Further, the display section 109 displays specific information (e.g. photographing information and an FA zoom frame, referred to hereinafter) together with an image. Such display of a live view image and display of information as mentioned above constitute functions of an electronic viewfinder (EVF) used when a photographer adjusts the angle of view.

A system controller 114 determines exposure control values (an aperture value and a shutter speed) based on luminance information obtained by the image processing circuit 107. Then, the system controller 114 controls a diaphragm/shutter driving section 110 based on the exposure control values to thereby drive the diaphragm and shutter 105. Thus, AE (automatic exposure) control is performed.

Further, the system controller 114 obtains an amount of shake applied to the camera 100 based on an angular velocity output from an angular velocity sensor (not shown), such as a gyro sensor. Then, the system controller 114 controls a vibration-proof lens-driving section 111 to drive the vibration-proof lens 104 based on the shake amount in such a manner as to offset (reduce) the shake amount.

A focus lens-driving section 112 drives the focus lens 103 under the control of the system controller 114. In the illustrated example, the system controller 114 performs AF (auto focus) control by a so-called contrast AF method. That is, the system controller 114 controls the focus lens-driving section 112 based on focus adjustment information (i.e. contrast evaluation value) obtained by the image processing circuit 107 to drive the focus lens 103 in such a manner as to focus on an object.

Note that the AF control method is not limited to the contrast AF method, but AF control may be performed by a so-called phase difference AF method or may be performed by a plurality of AF methods, such as a combination of the contrast AF method and another AF method.

The system controller 114 controls a zoom lens-driving section 113 to drive the zoom lens 102 according to a zoom operation instruction. An operation section 117 includes a zoom lever or a zoom button, which is a zoom operation member used by a photographer for instructing zooming. The system controller 114 determines a zoom driving speed and a zoom driving direction based on an operation amount and a direction of the operation of the zoom operation member. Then, the system controller 114 controls the zoom lens-driving section 113 based on the determined zoom driving speed and driving direction to drive the zoom lens 102 along the optical axis.

Image data generated by the image-pickup operation is sent to a recording section 116 via an interface 115. Then, the recording section 116 records the image data in one or both of an external recording medium mounted on the camera 100, such as a memory card, and a nonvolatile memory 118 incorporated in the camera 100.

The operation section 117 includes not only the above-mentioned zoom operation member, but also a release switch for instructing to start image pickup, an FA zoom operation switch for instructing to start or terminate FA zoom, and so on. Further, the operation section 117 is provided with a function (FUNC) button used by a user for configuring frequently used functions of the camera 100 while viewing the live view. Further, the operation section 117 includes operation members, such as a strobe setting button, a SET button, and a four-direction key (upper, lower, right, and left buttons) which is arranged into a cross shape for moving a cursor on a screen. Note that operation signals output according to the operation of the operation section 117 are sent to the system controller 114.

The memory 118 stores not only program data and image data, but also setting information of the camera 100 and position information, such as a zoom-in position in FA zoom, referred to hereinafter. Note that the zoom-in position refers to a zoom return position which is a target of zoom-in performed when FA zoom is terminated, and will be described in detail hereinafter.

The system controller 114 includes a computing unit, such as a CPU (central processing unit), that sends control commands to sections of the camera 100 according to the operation of a photographer to thereby control the overall operation of the camera 100. The system controller 114 executes various control programs stored in the memory 118, such as programs for controlling the image pickup device 106, and for performing AE/AF control and zoom control (including FA zoom processing).

Next, a description will be given of control performed by the system controller 114 in association with FA zoom.

As shown in FIG. 1, the system controller 114 includes a CZ controller 119, an electronic zoom controller 120, an FA zoom frame controller 121, an FA zoom controller 122, and an object detection section 123.

In a case where the lens barrel 101 is of a rear focus type, to maintain the in-focus state when the angle of view is changed by the optical zoom, it is necessary to control the focus lens 103 to a proper focus position according to the position of the zoom lens 102. This control is referred to as the computer zoom (CZ) control.

Figure 2:
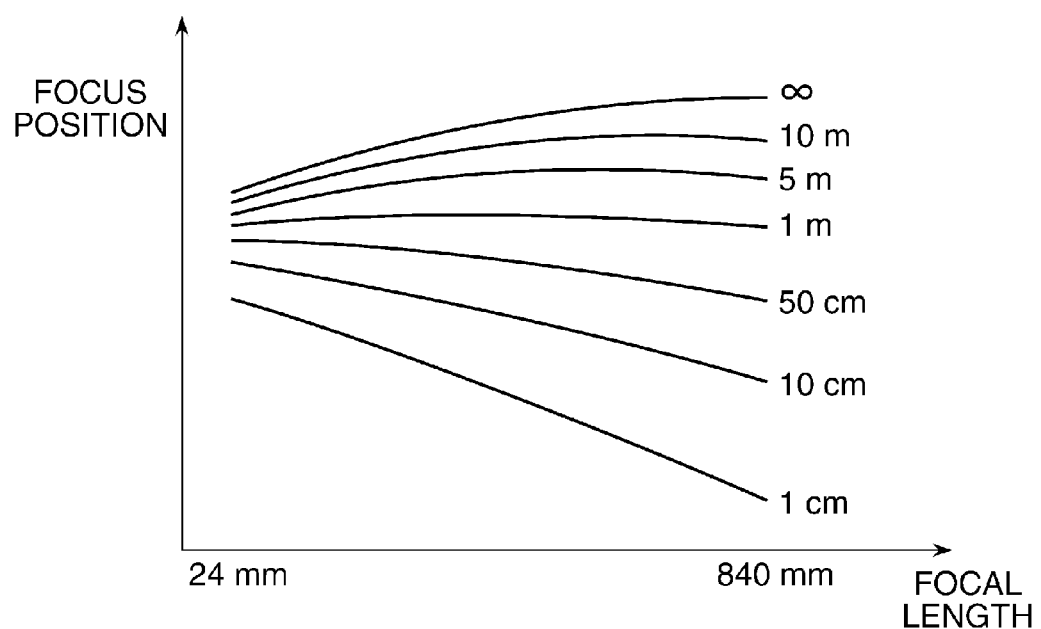
FIG. 2 is a diagram showing a relationship between a focal length of a zoom lens appearing in FIG. 1 and a focus position for each object distance.

FIG. 2 is a diagram showing a relationship between the focal length of the zoom lens appearing in FIG. 1 and the focus position for each object distance.

In the example shown in FIG. 2, the relationship between the focal length of the zoom lens and the focus position where an object is in focus is represented in a graph of a data table in which the relationship is illustrated for each distance to the object. In the following description, this data table is referred to as the focus cam table.

Referring to FIG. 2, the horizontal axis represents the focal length corresponding to the zoom position, and the vertical axis represents the focus position. A distance from the camera 100 to the object (object distance) is indicated at a location adjacent to an end of each graph line.

When performing AF control, the system controller 114 controls the focus lens-driving section 112 to perform a scan operation for moving the focus lens 103 within a predetermined range. Then, the system controller 114 detects a focus position, which is an in-focus point, by a known method using a contrast evaluation value or the like obtained during the scan operation. The system controller 114 measures the object distance using the zoom position and the focus position at the time, with reference to the focus cam table.

The illustrated camera 100 has an optical zoom function and an electronic zoom function. The CZ controller 119 controls the zoom lens-driving section 113 to perform the optical zoom. The CZ controller 119 detects a zoom position of the zoom lens 102 at each predetermined control period during the zoom operation. Then, the CZ controller 119 drives the focus lens 103 in such a manner as to follow the focus cam table, at the object distance measured by AF control according to the detected zoom position. This makes it possible to perform the optical zoom operation in a state in which the in-focus state is maintained.

On the other hand, the electronic zoom controller 120 performs the electronic zoom using the image memory 108. The electronic zoom controller 120 cuts out a target area from image data transferred to the image memory 108, and performs the electronic zoom. Further, the electronic zoom controller 120 performs smooth electronic zoom display by displaying an image on the display section 109 while gradually increasing the range of the target area cut out at a frame rate period of the image pickup device 106.

The object detection section 123 detects a predetermined object area from image data stored in the image memory 108. Here, a description will be given of an object detection method (face detection processing or color detection processing) for detecting an object (a face or a physical object) based on face information or color information included in the image data.

Face detection processing is processing for detecting a face area existing in image data using a known algorithm. For example, the object detection section 123 extracts a feature value from a square-shaped partial area set in the image data, and compares the extracted feature value with a predetermined feature value of a face. Then, if correlation between the two exceeds a predetermined threshold value, the object detection section 123 determines that the partial area is a face area. This determination is repeated while changing a combination of the size, the layout, and the arrangement angle of each partial area, whereby it is possible to detect various face areas existing in the image data.

In color detection processing, color information of an object area designated according to an object designation method, described hereinafter, is stored as a feature color. Color detection processing is performed when an object to be detected is a physical object (substance other than a person). As the color information, RGB signals output from the image processing circuit 107, a luminance Y and color differences R-Y, B-Y, or the like, are used. When detecting an object, the object detection section 123 divides the image data into a plurality of partial areas, and calculates a luminance and an average value of color differences for each partial area.

Further, the object detection section 123 compares feature color information stored in advance and color information of each area obtained when detecting an object, and sets a partial area having differences of the luminance and the color difference not larger than predetermined values, as a candidate of the object area. Then, the object detection section 123 sets a block of the partial areas adjacent to each other in the area candidates as an identical color area, and sets an area having the identical color areas within a range of a predetermined size, as the final object area.

The object detection section 123 estimates the size of the object area in the image data by using not only the face information and the color information but also the object distance information measured by the CZ controller 119 and the focal length information of the zoom lens 102.

A posture detection section 124 detects a posture of the camera 100 (e.g. a normal position, a grip-at-top position, and a grip-at-bottom position) based on a detection result output from an acceleration sensor (not shown). A shake detection section 125 detects a state of shake of the camera 100 based on an output e.g. from a gyro sensor (angular velocity detection means: not shown). The shake detection section 125 detects whether or not the camera 100 has been panned, based on an amount of shake applied to the gyro sensor.

As the above-mentioned acceleration sensor and gyro sensor for use in posture detection and shake detection, a sensor used when controlling the vibration-proof lens-driving section 111 may be used in a shared manner. Further, an amount of shake may be detected by using the acceleration sensor for use in posture detection. In this case, it is necessary to conveniently calculate an angular velocity based on accelerations along a plurality of axes.

Next, a description will be given of the outline of FA zoom, and the operations of the FA zoom frame controller 121 and the FA zoom controller 122.

The camera 100 shown in FIG. 1 has the three modes (FA zoom modes) of a manual search mode, an automatic tracking mode, and an automatic search mode, as modes for executing FA zoom. The manual search mode is a mode for recapturing, when an object is framed-out, the object by a photographer's operation of the FA zoom operation switch. The automatic tracking mode is a mode for assisting adjustment of the angle of view by the camera 100 through automatic detection of an object. The automatic search mode is a mode for automatically recapturing the object by detecting the movement of the camera 100.

The following description will be given of the outline of the function in each mode.

In a camera which is not equipped with the FA zoom function, for example, when a photographer is performing framing in a telephoto state and is waiting for a photographic opportunity, if an object moves and is framed-out, the photographer is required to perform the following operations:

First, the photographer performs zoom-out by operating the zoom operation member, and then searches for the object. Then, after finding the object, the photographer adjusts the angle of view by performing the zoom operation until a desired angle of view is obtained again.

On the other hand, in the camera 100 having the manual search mode in the FA zoom function, if the object is missed in a state in which adjustment of the angle of view, for example, is being performed before photographing (hereinafter referred to as the photographing preparation state), the photographer is only required to operate the FA zoom operation switch. The FA zoom operation switch is a switch which is allocated for the FA zoom function, as a separate member from the zoom operation member. When the FA zoom operation switch is pressed, an instruction for the start of the FA zoom function is given to the camera 100. In response to the instruction for the start of the FA zoom start, the FA zoom controller 122 stores respective zoom positions of the electronic zoom and the optical zoom in the memory 118. Further, the FA zoom controller 122 instructs the CZ controller 119 or the electronic zoom controller 120 to perform zoom-out in the wide-angle direction according to a processing procedure, described hereinafter, to thereby make the angle of view more zoomed-out than in the photographing preparation state (hereinafter referred to as the object searching state).

Next, the angle of view in the photographing preparation state and the object searching state of the camera 100 shown in FIG. 1 will be described.

Figure 3A:
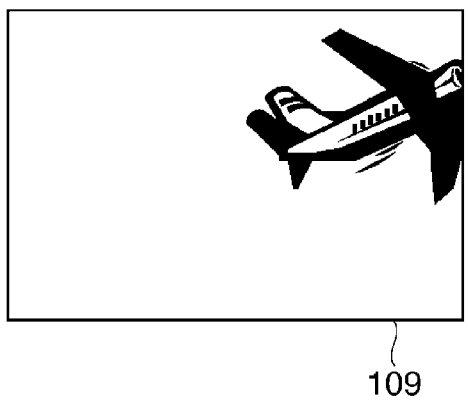
FIGS. 3A to 3D are diagrams useful in explaining the angle of view in a photographing preparation state and an object searching state of the camera shown in FIG. 1, in which FIGS. 3A and 3D each show the angle of view in a zoomed-in state (photographing preparation state), and FIGS. 3B and 3C each show the angle of view in a zoomed-out state (object searching state).
Figure 3B:
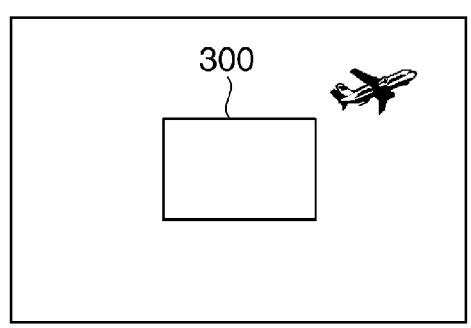
Figure 3C:
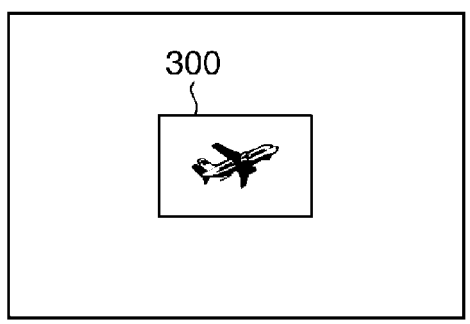
Figure 3D:
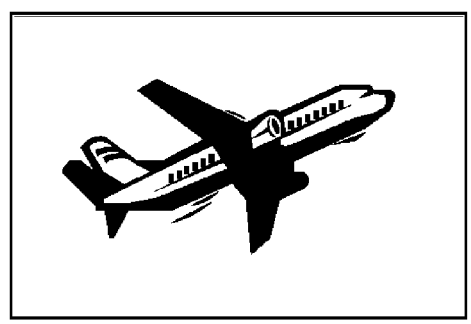

FIGS. 3A to 3D are diagrams useful in explaining the angle of view in the photographing preparation state and the object searching state of the camera 100 shown in FIG. 1, in which FIGS. 3A and 3D each show the angle of view in the zoomed-in state (photographing preparation state), and FIGS. 3B and 3C each show the angle of view in the zoomed-out state (object searching state).

As shown in FIG. 3A, in a case where an object (a plane in this example) has been framed-out (or is about to be framed-out), the photographer presses the FA zoom operation switch to search for the object in the above-mentioned manual search mode. While the FA zoom operation switch is being pressed, the zoomed-out state is maintained, and an FA zoom frame 300 indicative of a zoom-in position is displayed on the display section 109 in a manner superimposed on the image.

On the other hand, as shown in FIG. 3B, in a case where the desired object is found in the zoomed-out state (object searching state), the photographer performs framing such that the object is contained in the FA zoom frame 300, as shown in FIG. 3C. After that, when the photographer releases the FA zoom operation switch, an instruction for terminating FA zoom is given to the FA zoom controller 122.

In response to the instruction, the FA zoom controller 122 performs a zoom-in operation for zooming using the electronic zoom and/or the optical zoom such that the stored zoom position (zoom-in position) in the photographing preparation state is reached. This makes it possible to obtain the optimum framing state, as shown in FIG. 3D.

As shown in FIGS. 3B and 3C, the FA zoom frame controller 121 calculates the size of the stored angle of view in the photographing preparation state, and displays the FA zoom frame 300 on the center part of the EVF of the display section 109. The size of the FA zoom frame 300 is determined according to a zoom magnification ratio at the time of execution of zoom-out. For example, let it be assumed that the photographing preparation state is changed to the object searching state by zoom-out with an electric zoom magnification ratio of 1/2 and an optical zoom magnification ratio of 1/3. In this case, the FA zoom frame is displayed with the size with a magnification ratio of 1/6 ((1/2)×(1/3)=1/6) with respect to the angle of view displayed on the EVF in the object searching state.

As described above, by using the manual search mode, the photographer can perform photographing at a desired angle of view while causing the framed-out object to be framed-in again, with a simplified operation.

Further, in a case where photographing is performed in a scene in which an object is ready to be framed-out, e.g. in a case where a moving object is photographed, it is possible to more easily prevent the object from being framed-out and recapture a framed-out object, by a mode in which the camera 100 automatically changes the zoom position. Here, the mode in which the camera 100 automatically changes the zoom position is the automatic tracking mode or the automatic search mode. Particularly, in photographing in the telephoto state, the angle of view is narrow, and hence an object is sometimes framed-out even when the camera is slightly moved e.g. due to hand shake.

The illustrated camera 100 has the automatic tracking mode in the FA zoom function, as described above. When using the automatic tracking mode, after setting the automatic tracking mode, the photographer is only required to perform an operation for designating an object desired to be photographed using the touch panel or the like to thereby designate the object. The object can be designated not only by the method of operating the touch panel but also by a method of designating an object in the center or its vicinity of the screen when a specific button is pressed, or a method of designating a main object automatically selected from objects detected by the camera.

The object detection section 123 calculates the position and size of a designated object area in the image data recorded in the image memory 108. By continuously performing this processing on the image data whenever the image is displayed as the live view, it is possible to track the movement of the object. When the object to be tracked is detected in a zoom-out area, described hereinafter, or when the size of the object becomes larger than a predetermined size, the FA zoom controller 122 gives an instruction for zoom-out in the wide-angle direction to the CZ controller 119 or the electronic zoom controller 120. When the object is detected in a zoom-in area within the FA zoom frame 300 and is also caused to be contained within a range of a predetermined size, the FA zoom controller 122 performs a zoom-in operation for zoom-in such that a zoom position on the telephoto side, indicated by the FA zoom frame 300, is reached.

With the above-described processing, in the automatic tracking mode, the photographer is only required to move the camera so as to cause the object to be contained in the screen without paying attention to the zoom operation. Even when the object is about to be framed-out, the zoom position is automatically changed, and hence it is possible to more easily adjust the angle of view.

Further, the illustrated camera 100 has the automatic search mode in the FA zoom function. The automatic search mode is a mode performed in a case where an object cannot be detected in the automatic tracking mode. In the automatic search mode, the movement of the camera 100 is detected by the shake detection section 125. Then, in a case where the camera 100 has been largely moved, the FA zoom controller 122 gives an instruction for zooming-out in the wide-angle direction to the CZ controller 119 or the electronic zoom controller 120. After that, when the movement of the camera 100 is stopped, the FA zoom controller 122 performs a zoom-in operation in the telephoto direction.

By performing this processing, in the automatic search mode, when an object is framed-out, the photographer is only required to largely move the camera 100 without performing the zoom operation. Even when the object is framed-out, the zoom position is automatically changed, and hence it is possible to easily recapture the object, and further, it is possible to immediately return the angle of view to that before the frame-out, after recapturing the object. Further, by performing the automatic tracking mode and the automatic search mode at suitable timing, the photographer can easily perform framing.

Next, a description will be given of conditions for starting the zoom-out operation and the zoom-in operation in the automatic tracking mode of the camera 100 shown in FIG. 1.

Figure 4:
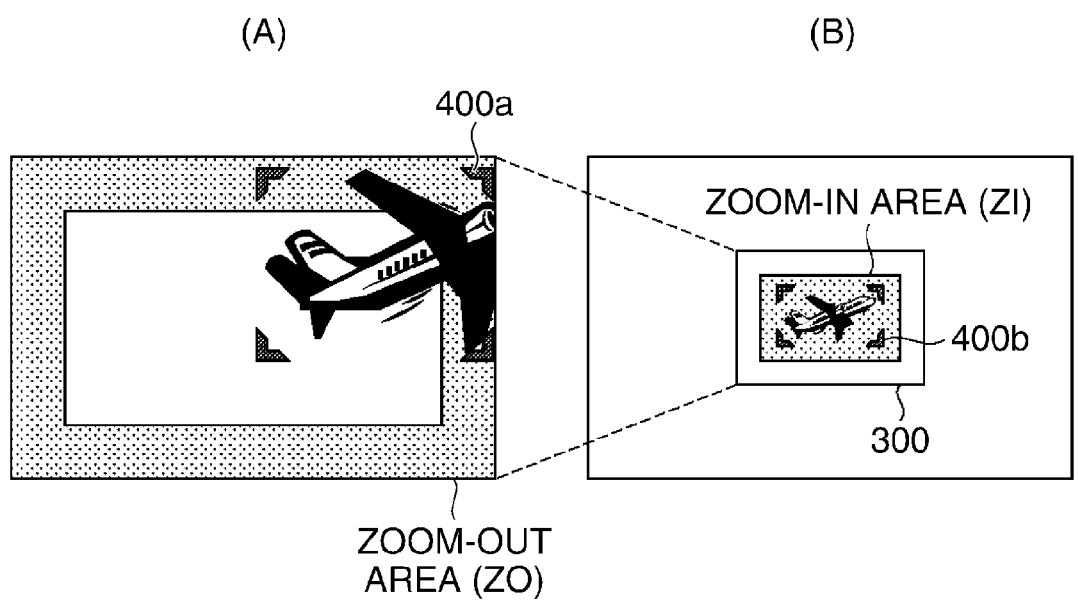
FIG. 4 is a diagram useful in explaining processing performed by the camera shown in FIG. 1, for preventing frame-out of an object (physical object) to the outside of a screen, in which (A) of FIG. 4 shows an area outside an area corresponding to a predetermined ratio with respect to the whole angle of view (whole screen), as a zoom-out area, and (B) of FIG. 4 shows an angle of view obtained by zoom-out from the angle of view shown in (A) of FIG. 4 by a predetermined zoom driving amount.

FIG. 4 is a diagram useful in explaining processing performed by the camera 100 shown in FIG. 1, for preventing frame-out of an object (physical object) to the outside of the screen. (A) of FIG. 4 shows an area outside an area corresponding to a predetermined ratio with respect to the whole angle of view (whole screen), as a zoom-out area, and (B) of FIG. 4 shows an angle of view obtained by zoom-out from the angle of view shown in (A) of FIG. 4 by a predetermined zoom driving amount.

A physical object-tracking frame is used when tracking an object (physical object other than a person). Further, a face tracking frame, referred to hereinafter, is used when tracking an object (face of a person). Here, in a case where an object can be applied to both of a person and a physical object, the physical object-tracking frame and the face tracking frame are sometimes collectively referred to as the object tracking frame.

The object tracking frame is displayed on the EVF of the display section 109 in a manner surrounding an object so as to make clear an object designated by the photographer. The object detection section 123 calculates the position and size of the object tracking frame on the screen based on the face information and the color information. Then, the object tracking frame is updated at a frame rate period.

(A) of FIG. 4 shows an area outside an area corresponding to a predetermined ratio with respect to the whole angle of view (whole screen) displayed on the EVF, as a zoom-out area ZO. For example, assuming that the ratio of an angle of view of the center point of the screen to an angle of view of the whole screen is 0%, and the ratio of the angle of view of the whole screen to itself is 100%, four sides of an area of which the ratio of an angle of view to the angle of view of the whole screen is 80% are set as a boundary of the zoom-out area ZO. In this case, an area outside the boundary, which corresponds to 80% to 100% in terms of the ratio of angle of view to that of the whole screen is the zoom-out area ZO.

When part of a physical object-tracking frame 400a enters the zoom-out area ZO within the screen, the FA zoom controller 122 starts a zoom-out operation. Further, the FA zoom controller 122 stores the zoom position (corresponding to a zoom-in view angle) before moving the zoom position, in the memory 118. The zoom magnification ratio and zoom speed in the zoom-out operation are set in advance according to the size and moving speed of the object. Note that the zoom magnification ratio and zoom speed may be calculated, as required, according to the size and moving speed of the object. The zoom-out operation is executed according to the zoom magnification ratio and zoom speed, set in advance or calculated. This makes it possible to effectively prevent the object from being framed-out.

(B) of FIG. 4 shows an area inside of which the ratio of an angle of view to the zoom-in view angle indicated by the FA zoom frame 300 is smaller than a predetermined ratio in the object searching state, as a zoom-in area ZI. For example, assuming that the ratio of an angle of view of the center point of the screen to an angle of view of the FA zoom frame 300 (zoom-in view angle) is 0%, and the ratio of the zoom-in view angle to itself is 100%, four sides of an area of which the ratio of an angle of view to the zoom-in view angle is 70% are set as a boundary of the zoom-in area ZI. In this case, if a zoom-out magnification ratio is e.g. 1/2, the size of the FA zoom frame 300 corresponds to 50% of the size of the whole screen.

Therefore, it can be said that the zoom-in area ZI is an area of 0% to 35% (=70%×(1/2)) with respect to the whole screen. When the photographer has changed the orientation of the camera such that a physical object-tracking frame 400b is contained in the zoom-in area ZI, the FA zoom controller 122 starts a zoom-in operation.

Also in a case where the object is a person, when part of the face tracking frame enters the zoom-out area ZO, the FA zoom controller 122 starts a zoom-out operation, and when the face tracking frame is contained in the zoom-in area, the FA zoom controller 122 performs a zoom-in operation. When the object is a person, a direction in which the object moves can be predicted to some extent, and hence the zoom-out area and the zoom-in area are set only in an area in the predicted moving direction.

Further, in a case where the photographer performs photographing while holding the camera 100 in his/her hand, the object may be framed-out e.g. due to a hand shake. On the other hand, in a case where the object is framed-out due to a hand shake, it is possible to frame-in the object again by the operation of the photographer who intends to frame-in the object.

Here, if the zoom-out area is set in an upper part of the screen, even when photographing a person positioned in the center or its vicinity, the face tracking frame sometimes enters the zoom-out area, and the zoom-out operation is sometimes unintentionally performed. To cope with this, in a case where the object is a person and the photographer holds the camera 100 with his/her hand, the zoo-out area is prevented from being set in an upper part of the screen, by taking into account the framing operation of the photographer.

As described above, when a face is detected by the object detection section 123, the zoom-out area and the zoom-in area are dynamically changed according to the posture of the camera, which is detected by the posture detection section 124, and a detection result output from the shake detection section 125. Note that the detection result output from the shake detection section 125 is a detection result indicative of whether or not the camera is held in the hand(s) of a photographer.

Figure 5A:
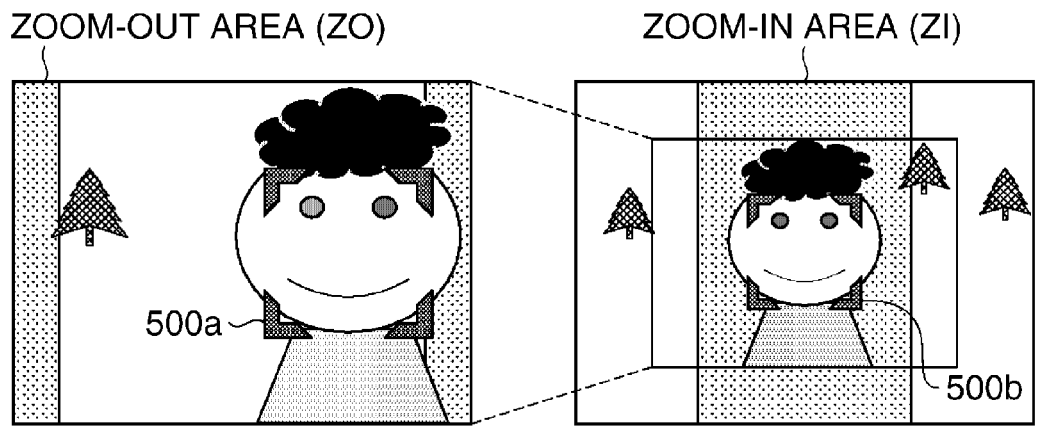
FIGS. 5A to 5C are diagrams useful in explaining processing performed by the camera shown in FIG. 1, for preventing frame-out of an object (person) to the outside of the screen.
Figure 5B:
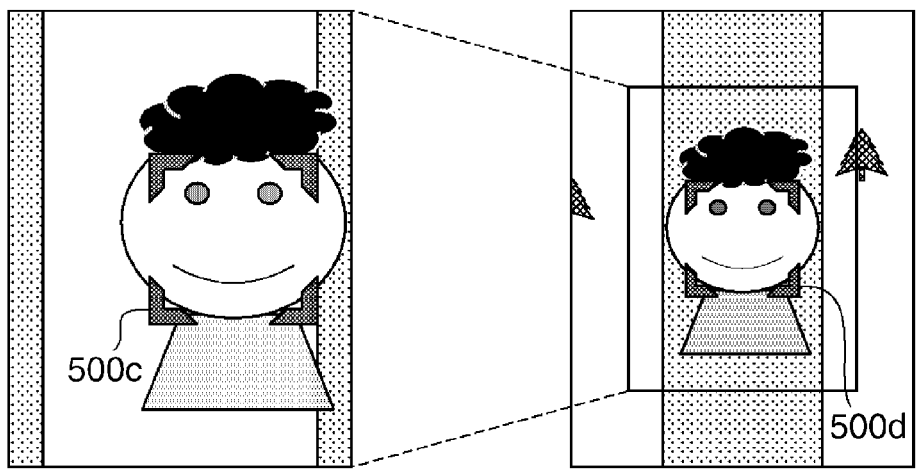
Figure 5C:
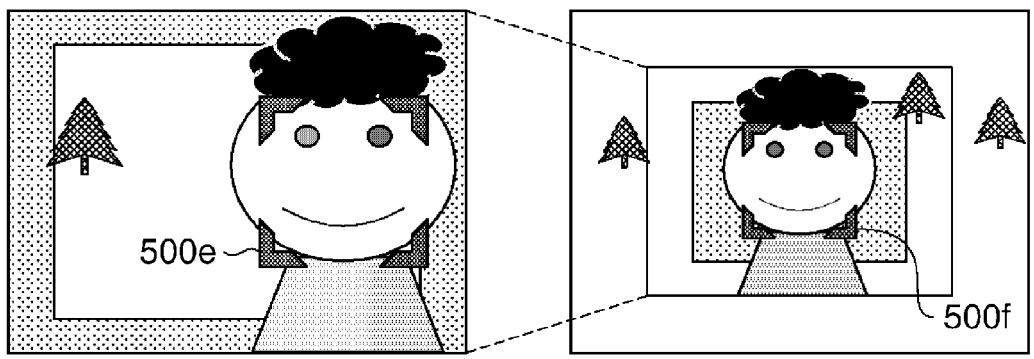

FIGS. 5A to 5C are diagrams useful in explaining processing for preventing frame-out of an object (person) to the outside of the screen, performed by the camera 100 shown in FIG. 1, in which FIG. 5A shows the zoom-out area and the zoom-in area, set when the camera is held in the hand(s) of a photographer in the normal position, FIG. 5B shows the zoom-out area and the zoom-in area, set when the camera is in a vertically set state, i.e. in a grip-at-bottom position or grip-at-top position, and FIG. 5C shows the zoom-out area and the zoom-in area, set when the state of the camera detected by the shake detection section, appearing in FIG. 1, is a fixed state.

Referring to FIG. 5A, in a case where an object moves in a horizontal direction to be framed-out, the position of the object on the screen moves in the horizontal direction (longitudinal direction) with respect to the screen set in the normal position. In view of this, the zoom-out area ZO and the zoom-in area ZI each in the form of a vertical belt are arranged in a vertical direction (transverse direction) with respect to the screen in the normal position. Then, when a face tracking frame 500a enters the zoom-out area ZO, the FA zoom controller 122 determines that zoom-out should be started, and performs a zoom-out operation to an extent corresponding to a predetermined zoom magnification ratio.

Further, when a face tracking frame 500b is contained in the zoom-in area ZI, the FA zoom controller 122 determines that zoom-in should be started, and performs a zoom-in operation to an extent corresponding to a predetermined zoom magnification ratio until the zoom return position is reached. By thus setting the zoom-out area ZO and the zoom-in area ZI, it is possible to effectively prevent the object from being framed-out.

Referring to FIG. 5B, the zoom-out area ZO and the zoom-in area ZI each in the form of a vertical belt are arranged in a direction (longitudinal direction) with respect to the screen in the vertical position. Then, when a face tracking frame 500c enters the zoom-out area ZO, the FA zoom controller 122 determines that zoom-out should be started, and performs a zoom-out operation to an extent corresponding to a predetermined zoom magnification ratio.

Further, when a face tracking frame 500d is contained in the zoom-in area ZI, the FA zoom controller 122 determines that zoom-in should be started, and performs a zoom-in operation to an extent corresponding to a predetermined zoom magnification ratio until the zoom return position is reached. By thus setting the zoom-out area ZO and the zoom-in area ZI, it is possible to detect the movement of the object in the horizontal direction, and effectively prevent the object from being framed-out.

Referring to FIG. 5C, in a case where the camera 100 is fixed to e.g. a tripod, there is no fear of frame-out due to a hand shake. Further, if a zoom-in operation is performed when the object is not framed-in in the center or its vicinity of the screen, there is a fear that the object is framed-out due to the zoom-in operation.

Therefore, the zoom-out area ZO is set in the whole peripheral part of the screen, and the zoom-in area ZI is set inside the zoom-in view angle. Then, when a face tracking frame 500e enters the zoom-out area ZO, the FA zoom controller 122 determines that zoom-out should be started, and performs a zoom-out operation to an extent corresponding to a predetermined zoom magnification ratio. Further, when a face tracking frame 500f is contained in the zoom-in area ZI, the FA zoom controller 122 determines that zoom-in should be started, and performs a zoom-in operation to an extent corresponding to a predetermined zoom magnification ratio until the zoom return position is reached.

As described above, the zoom-out area ZO and the zoom-in area ZI are dynamically changed according to a change in the posture and the photographing state (the hand-held state or the fixed state) of the camera 100, whereby it is possible to effectively prevent an object from being framed-out while preventing an erroneous operation responsive to hand shake.

Note that the zoom-out area ZO or the zoom-in area ZI may be changed according to one of the posture and the photographing state (the hand-held state or the fixed state) of the camera 100. Further, only one of the zoom-out area ZO and the zoom-in area ZI may be changed.

FIGS. 6A and 6B are diagrams useful in explaining zoom operations performed by the camera 100 shown in FIG. 1, in which FIG. 6A shows a zoom operation performed when a person as an object moves toward the camera, and FIG. 6B shows a zoom operation performed when a person as an object moves away from the camera. Here, the camera 100 performs the zoom operation so as to make the ratio of an area occupied by an object to the whole screen within a predetermined ratio. Further, the face tracking frame is displayed in a manner surrounding a face area which is a feature area of a person as an object. Therefore, the following description is given assuming that the size of the face tracking frame is equal to the object size.

(A) of FIG. 6A shows an angle of view displayed when an object is designated according to the object designation method, described hereinafter. The FA zoom controller 122 stores the size of a face tracking frame 600a displayed when the object is designated, in the memory 118, as a reference object size (reference size).

(B) of FIG. 6A shows an angle of view displayed when the object is moving toward the camera 100 without changing the zoom position from the state shown in (A) of FIG. 6A. For example, when the size of the face tracking frame increases to 150% of the size of the face tracking frame 600a which is the reference object size, it is determined that a zoom-out operation should be started. When the relationship between the size of the face tracking frame 600a (reference size) and the size of a following face tracking frame 600b becomes such that the face tracking frame 600b>the face tracking frame 600a×150%, the FA zoom controller 122 determines that a zoom-out operation should be started.

(C) of FIG. 6A shows an angle of view 601 and a face tracking frame 600c obtained by zoom-out from the angle of view shown in FIG. 6B to an extent corresponding to a predetermined zoom magnification ratio. Here, by taking into account a change ratio (150%) of the size of the face tracking frame from the reference object size at the start of the zoom-out operation, the predetermined zoom magnification ratio is set to 1/1.5. If the object is further moving toward the camera 100, the FA zoom controller 122 further performs zoom-out in the wide-angle direction, and continues to make the ratio of the object within the predetermined ratio. This enables the photographer to concentrate only on the operation of the release switch.

(A) of FIG. 6B shows an angle of view displayed when an object is designated according to the object designation method, described hereinafter. The FA zoom controller 122 stores the size of a face tracking frame 600d displayed when the object is designated, in the memory 118, as the reference object size.

(B) of FIG. 6B shows an angle of view displayed when the object has moved away from the camera 100, without changing the zoom position from the state shown in (A) of FIG. 6B. For example, when the size of the face tracking frame decreases to 50% of the size of the face tracking frame 600d which is the reference object size, it is determined that a zoom-in operation should be started. When the relationship between the size of the face tracking frame 600d (reference size) and the size of a following face tracking frame 600e becomes such that the face tracking frame 600e<the face tracking frame 600d×50%, and also it is determined that the face tracking frame 600e is contained in the zoom-in area ZI, the FA zoom controller 122 determines that a zoom-in operation should be started. Here, the FA zoom controller 122 sets the zoom-in area ZI inside an angle of view 602 to be obtained by zoom-in from the angle of view shown in (B) of FIG. 6B to an extent corresponding to a predetermined zoom magnification ratio.

(C) of FIG. 6B shows an angle of view (corresponding to the angle of view 602) and a face tracking frame 600f obtained by zoom-in from the angle of view shown in (B) of FIG. 6B to an extent corresponding to the predetermined zoom magnification ratio. Here, by taking into account a change ratio (50%) of the size of the face tracking frame from the reference object size at the start of the zoom-in operation, the predetermined zoom magnification ratio is set to 1/0.5.

In FIG. 4 and FIGS. 5A to 5C, the description is given of processing for preventing frame-out of an object in the case where the object is a physical object and a person, respectively. Further, in FIGS. 6A and 6B, the description is given of processing for making the ratio of an area occupied by an object to the whole screen within a predetermined ratio in a case where the object is a person. Note that similar to the case where the object is a person, in a case where the object to be tracked is a physical object as well, the zoom operation start determination for the object size-holding control, described with reference to FIGS. 6A and 6B, may be performed.

FIGS. 7A, 7B, 8, and 9 are a flowchart of an FA zoom process performed by the camera shown in FIG. 1. The process in FIGS. 7A to 9 is performed under the control of the FA zoom controller 122.

When the FA zoom process is started, the FA zoom controller 122 determines whether or not the FA zoom operation switch of the operation section 117 has been pressed (step S700). If the FA zoom operation switch has not been pressed (NO to the step S700), the FA zoom controller 122 waits, whereas if the FA zoom operation switch has been pressed (YES to the step S700), the FA zoom controller 122 measures a pressing time period over which the FA zoom operation switch has been pressed. Then, the FA zoom controller 122 determines whether or not the FA zoom operation switch has been released within a predetermined time period after the FA zoom operation switch was pressed (step S701). That is, the FA zoom controller 122 determines whether the FA zoom operation switch has been long-pressed or short-pressed (first operation), and changes the mode to be executed according to the pressing time period.

If the FA zoom operation switch has not been released within the predetermined time period, i.e. if the FA zoom operation switch has been long-pressed (NO to the step S701), the FA zoom controller 122 selects the manual search mode, and stores the selected mode in the memory 118 (step S820).

On the other hand, if the FA zoom operation switch has been released within the predetermined time period, i.e. if the FA zoom operation switch has been short-pressed (YES to the step S701), the FA zoom controller 122 selects the automatic tracking mode (first mode), and stores the selected mode in the memory 118 (step S702).

After storing the manual search mode in the step S820, the FA zoom controller 122 performs an FA zoom-out operation, described hereinafter (step S821). Then, when the FA zoom-out operation is terminated, the FA zoom controller 122 determines whether or not the FA zoom operation switch has been released from the long-pressed state (step S822). If the FA zoom operation switch has not been released (NO to the step S822), the FA zoom controller 122 waits.

If the FA zoom operation switch has been released (YES to the step S822), the FA zoom controller 122 determines that the FA zoom is terminated. That is, the FA zoom controller 122 continues the framing assist (FA) zoom so long as the FA zoom operation switch of the operation section 117 is being pressed (operated) in the manual search mode. Then, when pressing of the FA zoom operation switch of the operation section 117 is terminated, the FA zoom controller 122 controls the CZ controller 119 or the electronic zoom controller 120 to drive the zoom such that an FA zoom-in operation, described hereinafter, is performed until the stored optical zoom position and electronic zoom position (zoom-in position) are reached (step S823). Then, the FA zoom controller 122 terminates the FA zoom in the manual search mode.

On the other hand, when the automatic tracking mode is selected, the FA zoom controller 122 stores the automatic tracking mode in the memory 118, and then determines whether or not the photographer (user) is performing an operation for setting the camera (step S750). If the photographer is performing configuration of settings of the camera (YES to the step S750), the FA zoom controller 122 determines whether or not a forcible zoom operation for forcibly performing the zoom operation has been performed (step S751).

If the forcible zoom operation has not been performed (NO to the step S751), the FA zoom controller 122 returns to the step S750. On the other hand, if the forcible zoom operation has been performed (YES to the step S751), the FA zoom controller 122 proceeds to a step S703, described hereinafter.

Figure 10A:
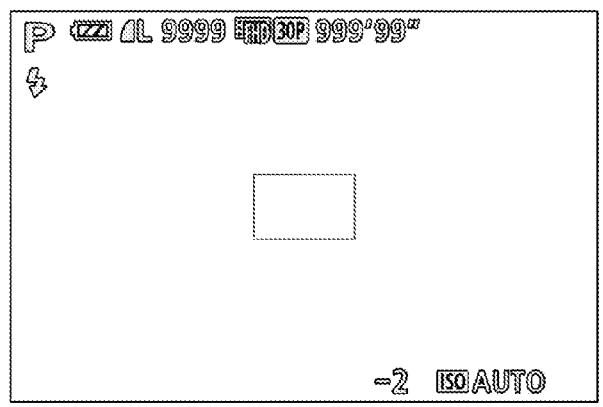
Figure 10B:
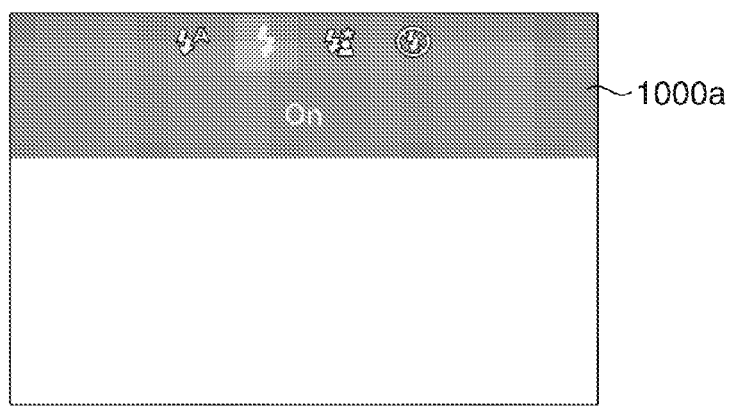
Figure 10C:
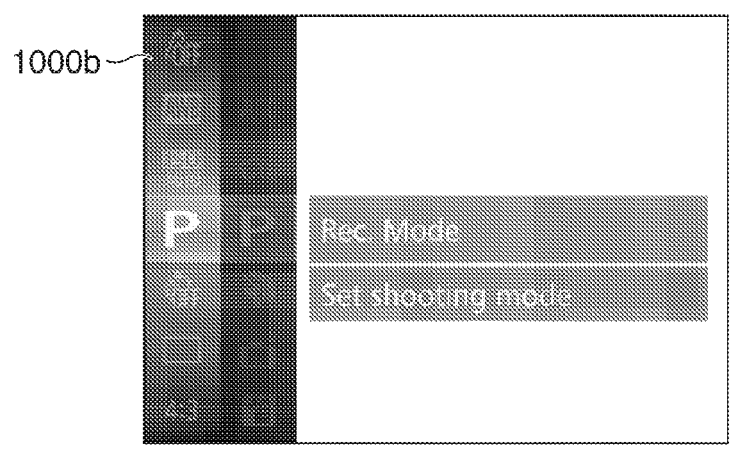

FIGS. 10A to 10C are diagrams each showing an example of a setting screen used by the camera 100 shown in FIG. 1, in which FIG. 10A shows a photographing standby screen, FIG. 10B shows a screen displayed when a strobe button is pressed, and FIG. 10C shows a screen displayed when the function (FUNC) button is pressed.

On the photographing standby screen shown in FIG. 10A, the live view is displayed on the display section 109, and the settings of the camera 100 are displayed by icons and the like in a manner superimposed on the image. When the photographer presses the strobe button to change the setting of the strobe in the photographing standby state, the FA zoom controller 122 displays the screen shown in FIG. 10B on the display section 109.

As shown in FIG. 10B, there are four icons representing respective strobe setting items: "AUTO", "forced emission", "slow synchronization", and "emission inhibition". These items are displayed as a list 1000a on a dialog. The photographer can change a selected strobe setting item using the four-direction key and finally determine the selected strobe setting item using the SET button.

Further, when the FUNC button is pressed in a case where the photographer desires to change the settings of the camera other than the strobe setting, the FA zoom controller 122 displays a screen shown in FIG. 10C on the display section 109. Examples of the settings other than the strobe setting include settings of the photographing mode, self-timer, the drive mode, the ISO sensitivity, and white balance, and a list 1000b of these items is displayed on the display section 109. Then, the photographer can change a selected item using the four-direction button, and finally determine the selected item using the SET button.

When performing the above-mentioned settings, although the live view itself can be viewed, there are few cases where the photographer performs photographing immediately after framing. Therefore, in this state, the FA zoom controller 122 restricts FA zoom-in/out to thereby prevent a case where the zoom operation is unintentionally performed, causing confusion of the photographer. Further, if the photographer desires to forcibly enable FA zoom-in/out even in this state of settings, the photographer can shift the camera to the FA zoom operation by performing the forcible zoom operation (i.e. forcible zoom enabling operation) by operating a button or the like (as described in the step S751).

If the photographer is not performing configuration of settings of the camera (NO to the step S750), the FA zoom controller 122 performs an object designation process, as described hereinafter (step S703).

Figure 7A:
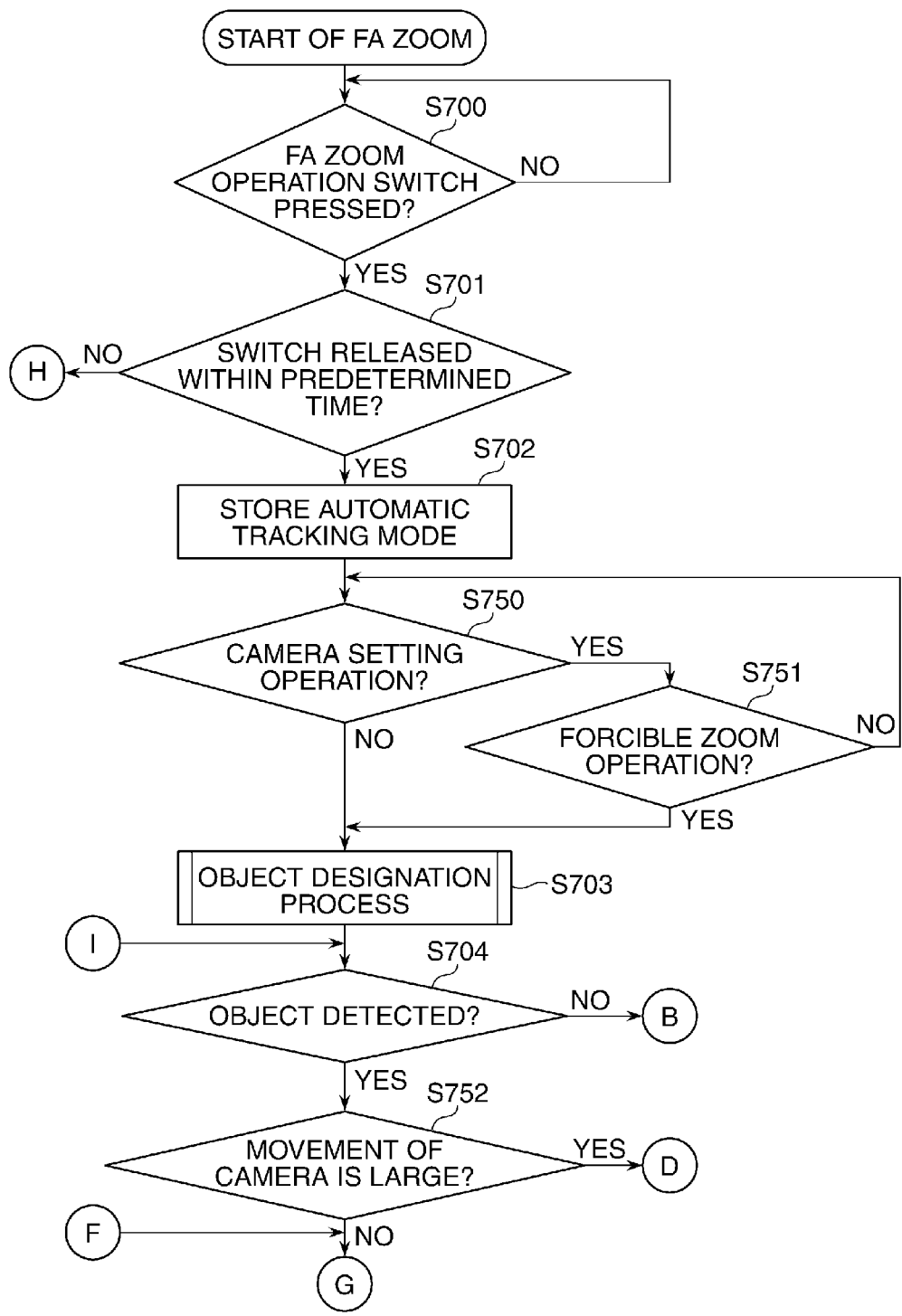
FIG. 7A is a flowchart of an FA zoom process performed by the camera shown in FIG. 1.
Figure 11A:
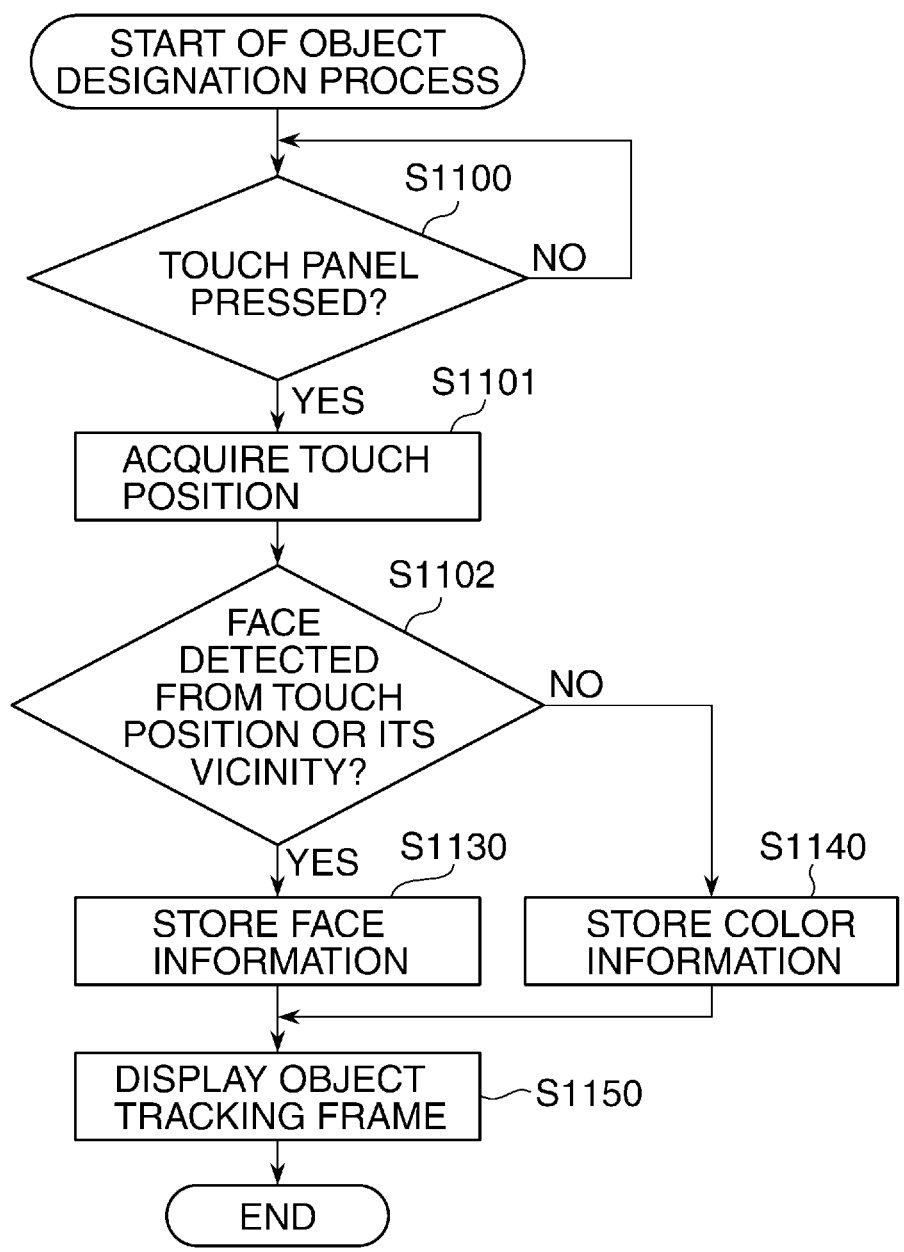
FIG. 11A is a flowchart of an object designation process, performed in a step in FIG. 7A, using a touch panel provided on an operation section appearing in FIG. 1.
Figure 11B:
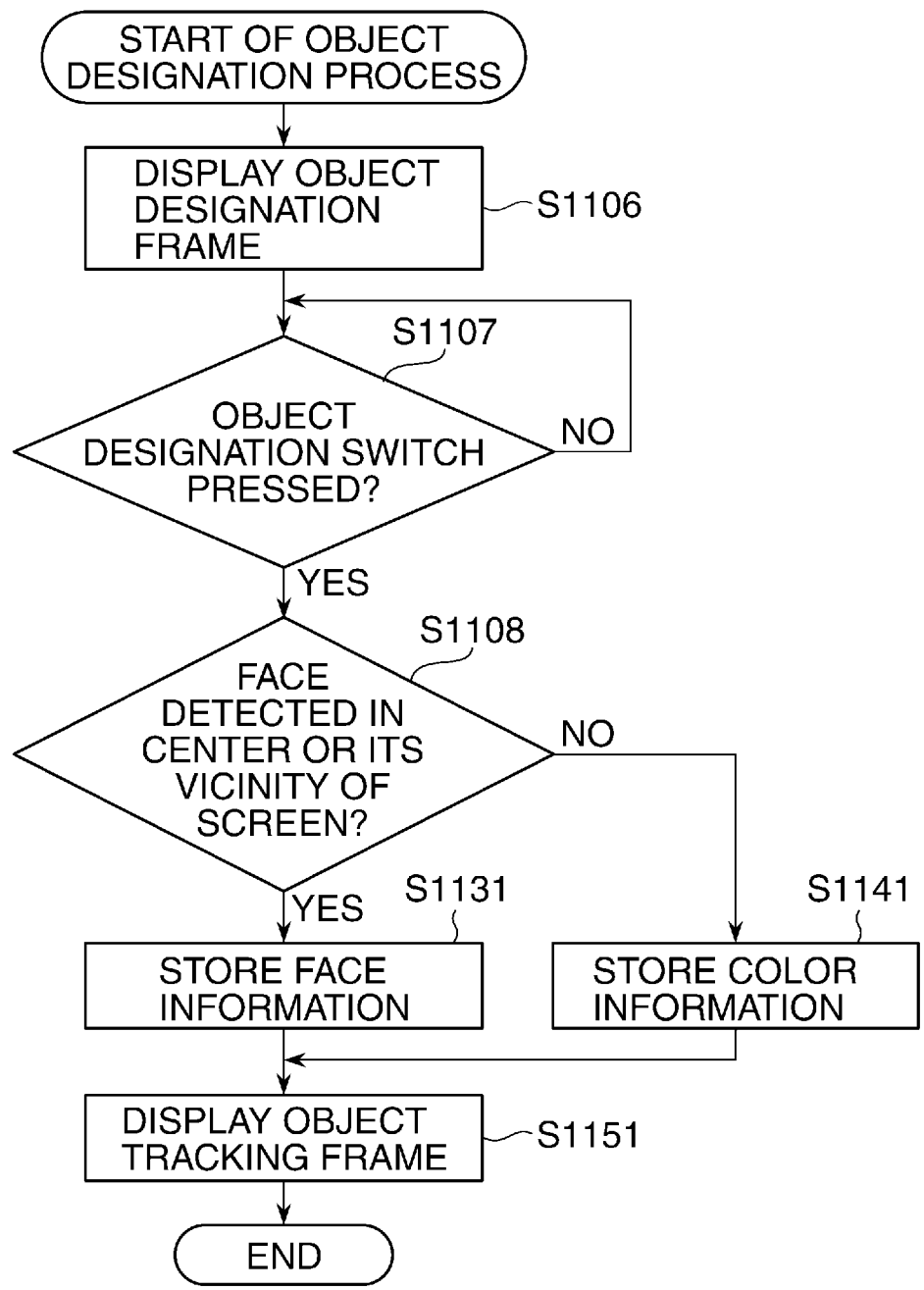
FIG. 11B is a flowchart of an object designation process, performed in the step in FIG. 7A, using an object designation switch provided on the operation section appearing in FIG. 1.
Figure 11C:
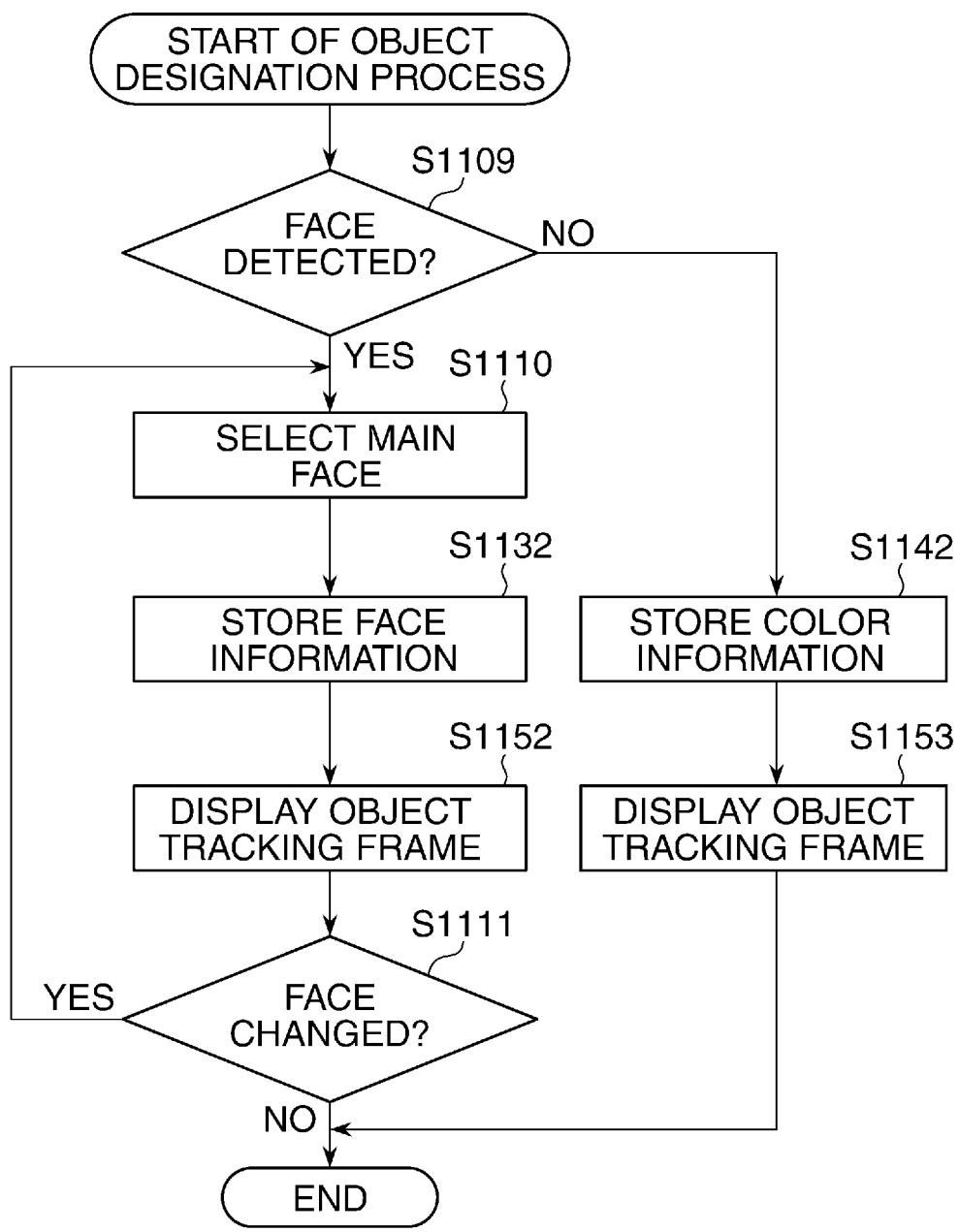
FIG. 11C is a flowchart of an object designation process, performed in the step in FIG. 7A, according to an operation of an FA zoom operation switch provided on the operation section appearing in FIG. 1.

FIGS. 11A to 11C are flowcharts of the object designation process performed in FIG. 7A, in which FIG. 11A is a flowchart of the object designation process using a touch panel provided on the operation section 117 appearing in FIG. 1, FIG. 11B is a flowchart of the object designation process using an object designation switch provided on the operation section 117 appearing in FIG. 1, and FIG. 11C is a flowchart of the object designation process, performed according to the operation of the FA zoom operation switch provided on the operation section 117 appearing in FIG. 1.

First, referring to FIG. 11A, in this process, it is assumed that the photographer designates an object in an image displayed on the display section 109 by a touch operation on the touch panel. When the object designation process is started, the FA zoom controller 122 determines whether or not the touch panel has been touched (pressed) (step S1100). If the touch panel has not been touched (NO to the step S1100), the FA zoom controller 122 waits. If the touch panel has been touched (YES to the step S1100), the FA zoom controller 122 acquires position information of a position where the touch panel has been touched by the photographer (touch position) (step S1101).

Then, the FA zoom controller 122 sends the touch position to the object detection section 123, and face detection is performed by the object detection section 123 at the touch position and its vicinity. Then, the FA zoom controller 122 determines whether or not a face is detected from the image at the touch position and its vicinity (step S1102). If a face is detected (YES to the step S1102), the FA zoom controller 122 stores the face information of the detected person in the memory 118 as an automatically tracking target (step S1130). For example, the FA zoom controller 122 stores the size, detected position, and orientation of the face, and so on, obtained when the object is designated, in the memory 118, as the face information. Note that in the case of a camera having a face authentication function, an authentication ID or the like is also stored.

On the other hand, if no face is detected (NO to the step S1102), the FA zoom controller 122 determines that the object is a physical object other than a person. Then, the FA zoom controller 122 stores the feature color of the touch position and its vicinity in the memory 118 as color information of the automatically tracking target (step S1140). For example, the FA zoom controller 122 stores a feature color, a luminance, a value of a color difference, a size of an area having the same color, the gravity center position of the area having the same color, and so forth, obtained when the object is designated, in the memory 118, as the color information. Note that in the following description, the face information and the color information are collectively referred to as the object information (the object size, the object detected position, and so on).

After execution of the step S1130 or S1140, the FA zoom controller 122 displays an object tracking frame (physical object-tracking frame or a face tracking frame) having the size corresponding to the object size on the display section 109 (step S1150), with the object detected position in the center. Then, the FA zoom controller 122 terminates the object designation process.

As described above, the system controller 114 (i.e. the FA zoom controller 122) detects an object at a position designated by the photographer and its vicinity on the display section 109, in the case where the automatic tracking mode is selected. Then, the system controller 114 displays the object tracking frame on the display section 109. This enables the photographer to easily designate an object desired to be tracked by using an intuitive designation method.

Next, referring to FIG. 11B, in this process, it is assumed that the photographer designates an object by using the object designation switch. When the object designation process is started, the FA zoom controller 122 displays a frame (object designation frame) which is used as a guide for object designation in the vicinity of the center of the screen of the display section 109 (step S1106). The photographer adjusts the orientation of the camera so as to cause the object desired to be tracked to be contained in the center and its vicinity, using the frame as the guide.

The FA zoom controller 122 determines whether or not the object designation switch has been pressed (step S1107). If the object designation switch has not been pressed (NO to the step S1107), the FA zoom controller 122 waits. On the other hand, if the object designation switch has been pressed (YES to the step S1107), the FA zoom controller 122 controls the object detection section 123 to perform face detection in the center and its vicinity of the screen. Then, the FA zoom controller 122 determines whether or not a face has been detected in the center or its vicinity of the screen (step S1108).

If a face has been detected in the center or its vicinity of the screen (YES to the step S1108), the FA zoom controller 122 determines that the object is a person. Then, the FA zoom controller 122 stores the face information in the memory 118 (step S1131). On the other hand, if no face has been detected in the center and its vicinity of the screen (NO to the step S1108), the FA zoom controller 122 determines that the object is a physical object other than a person. Then, the FA zoom controller 122 stores the color information in the memory 118 (step S1141).

After execution of the step S1131 or S1141, the FA zoom controller 122 displays the object tracking frame (physical object-tracking frame or face tracking frame) on the display section 109 (step S1151). Then, the FA zoom controller 122 terminates the object designation process. Note that basic processing performed in the steps S1131, S1141, and S1151 in FIG. 11B are the same as processing performed in the steps S1130, S1140, and S1150 in FIG. 11A, respectively.

As described above, the system controller 114 detects an object at the center position or its vicinity of the screen according to the operation of the object designation switch in the case where the automatic tracking mode is selected. Then, the system controller 114 displays the object tracking frame indicative of the position of the object on the display section 109. This enables the photographer to easily designate an object even in a camera that is not equipped with a touch panel or the like operation member.

Next, referring to FIG. 11C, in this process, an object to be tracked is selected based on a face detected at a time point when the FA zoom operation switch provided on the operation section 117 is short-pressed.

When the object designation process is started, the FA zoom controller 122 controls the object detection section 123 to perform face detection in the whole screen. Then, the FA zoom controller 122 determines whether or not a face has been detected from the whole screen (step S1109).

If a face has been detected from the whole screen (YES to the step S1109), in a case where one face has been detected by the object detection section 123, the FA zoom controller 122 selects the detected face as the main face. On the other hand, if a plurality of faces have been detected by the object detection section 123, the FA zoom controller 122 selects a main face which should be set as the object to be tracked, from the detected faces (step S1110).

When selecting the main face from the plurality of faces, for example, a face which is detected at a position close to the center of the screen is selected as the main face. Note that in a case where a plurality of faces are detected at similar positions, a face having the largest size is selected as the main face. Further, in the case of a camera having the face authentication function, if a face which is registered as an authenticated face is included in the detected faces, this face may be preferentially selected as the main face.

Then, the FA zoom controller 122 stores the face information associated with the selected main face in the memory 118 (step S1132). Then, the FA zoom controller 122 displays the face tracking frame on the display section 109 in a manner associated with the selected main face (step S1152).

If the main face selected from the plurality of faces is not a face intended by the photographer, the photographer can change the main face. In this case, the photographer presses a switch on the operation section 117 (the FA zoom operation switch or any other switch may be pressed) to thereby change the main face. The FA zoom controller 122 determines whether or not a change of the face has been instructed by the operation of the operation section 117 (step S1111). If a face changing instruction has not been received (NO to the step S1111), the FA zoom controller 122 terminates the object designation process. On the other hand, if a face changing instruction has been received (YES to the step S1111), the FA zoom controller 122 returns to the step S1100 to update the face information and stores the same (S1132). Then, the FA zoom controller 122 changes the face tracking frame according to the size and detected position of the main face which is newly selected, in the step S1152.

If no face has been detected from the whole screen (NO to the step S1109), the FA zoom controller 122 determines that the object is a physical object other than a person, and stores a feature color in the center and its vicinity of the screen in the memory 118 as the color information of the automatically tracking target (step S1142). Then, the FA zoom controller 122 displays the physical object-tracking frame on the display section 109 in a manner associated with the automatically tracking target (step S1153). Then, the FA zoom controller 122 terminates the object designation process.

Note that basic processing performed in the steps S1132, S1142, and S1152 (S1153) in FIG. 11C are the same as processing performed in the steps S1130, S1140, and S1150 in FIG. 11A, respectively.

As described above, the system controller 114 performs face detection in the whole screen of the display section 109 in the case where the automatic tracking mode is selected. Then, if a plurality of faces are detected, the system controller 114 displays the object tracking frame at a position of the main face (first face) selected from the plurality of faces as an object. Then, if the main face is changed from the first face to another face (second face), the system controller 114 displays the object tracking frame at a position of the second face. This enables the photographer to easily designate an object by performing less number of operations.

Referring again to FIGS. 7A to 9, when the object designation process is terminated, the FA zoom controller 122 determines, based on the reference object information stored at the time of designation of the object and the object information which is periodically detected, whether or not an object to be tracked has been detected, so as determine whether or not to start an FA zoom operation (step S704). This determination is repeated at a predetermined control period until FA zoom starting conditions are satisfied.

In the step S704, the FA zoom controller 122 determines whether or not an object having the same feature as that of the reference object information is detected from the whole screen, i.e. whether or not a face is detected in a case where the reference object is a person or the same feature color is detected in a case where the reference object is a physical object. If no object to be tracked is detected (NO to the step S704), the FA zoom controller 122 proceeds to a step S924 in FIG. 9 (described in detail with reference to FIGS. 14A and 14B).

Note that in the step S704, the FA zoom controller 122 may proceed to the step S924 when a predetermined time period elapses in a state in which no object is detected by the object detection section 123, or when the number of times of detecting no object reaches a predetermined number.

On the other hand, if an object to be tracked is detected (YES to the step S704), the FA zoom controller 122 obtains an amount of movement of the camera 100, and determines whether or not the amount of movement is not smaller than a predetermined amount. That is, the FA zoom controller 122 determines whether or not the movement of the camera 100 is large (step S752).

If the amount of movement is not smaller than the predetermined amount, i.e. if the movement of the camera 100 is large (YES to the step S752), the FA zoom controller 122 proceeds to a step S1801 in FIG. 18, described hereinafter. On the other hand, if the amount of movement is smaller than the predetermined amount, i.e. if the movement of the camera 100 is small (NO to the step S752), the FA zoom controller 122 proceeds to a step S705 in FIG. 7B, described hereinafter.

Note that processing in the steps S705, S712, and S713, described hereinafter, is processing for determining whether or not to start FA zoom for preventing frame-out of the object (for frame-out prevention control).

In the step S705, the FA zoom controller 122 determines whether or not the object tracking frame associated with the object to be tracked has entered the above-described zoom-out area ZO. If the object tracking frame has entered the zoom-out area ZO (YES to the step S705), i.e. if the object is highly likely to be framed-out, the FA zoom controller 122 starts the FA zoom-out operation, described hereinafter (step S706). This FA zoom-out operation corresponds to the zoom-out operation for the frame-out prevention control.

On the other hand, if the object tracking frame has not entered the zoom-out area ZO (NO to the step S705), i.e. if the object is captured in the center or its vicinity of the screen, the FA zoom controller 122 determines whether or not the immediately preceding zoom operation is a zoom-out operation performed due to entering the zoom-out area ZO, i.e. it is after the zoom-out operation for the frame-out prevention control (step S712).

If the immediately preceding zoom operation is the zoom-out operation for the frame-out prevention control (YES to the step S712), the FA zoom controller 122 determines whether or not the object tracking frame of the object to be tracked is contained (included) in the zoom-in area ZI (step S713). The zoom-in area ZI in this step corresponds to the zoom-in area ZI described with reference to (B) of FIG. 4, and FIGS. 5A to 5C.

If the object tracking frame is not contained in the zoom-in area ZI (NO to the step S713), the FA zoom controller 122 proceeds to a step S707, described hereinafter. On the other hand, if the object tracking frame is contained in the zoom-in area ZI (YES to the step S713), i.e. if the object is captured in the center or its vicinity of the screen such that the object size is within the angle of view of the zoom return position, the FA zoom controller 122 starts the FA zoom-in operation, described hereinafter (step S714). This FA zoom-in operation corresponds to the zoom-in operation for the frame-out prevention control.

In the illustrated example, to achieve both of the frame-out prevention control and size holding control in the automatic tracking mode, first, the object is captured in the center or its vicinity of the screen by performing the frame-out prevention control, and then the size holding control is enabled. Therefore, in the state after the zoom-out operation for the frame-out prevention control, FA zoom processing for maintaining the object size at a fixed size (FA zoom processing for the size holding control), described hereinafter, is not performed. In other words, when the frame-out prevention control is performed, the size holding control is inhibited until the zoom-in operation for the frame-out prevention control is completed.

If the immediately preceding zoom operation is not the zoom-out operation for the frame-out prevention control (NO to the step S712), the FA zoom controller 122 compares the object size of the reference object information and the object size detected in the step S704. Then, the FA zoom controller 122 determines whether or not the object size detected in the step S704 is larger than a size obtained by multiplying the size of the reference object by a predetermined value N1 (N1>1) (step S715). That is, the FA zoom controller 122 determines whether or not a ratio of the size of an area occupied by the object to the size of the screen is larger than the predetermined value. If the object size is larger than the size obtained by multiplying the size of the reference object by N1 (YES to the step S715), the FA zoom controller 122 starts the FA zoom-out operation, described hereinafter (step S716). This FA zoom-out operation corresponds to the zoom-out operation for the size holding control.

On the other hand, if the object size is not larger than the size obtained by multiplying the size of the reference object by N1 (NO to the step S715), the FA zoom controller 122 determines whether or not the detected object size is smaller than a size obtained by multiplying the size of the reference object by a predetermined value N2 (N2<1) (step S717). That is, the FA zoom controller 122 determines whether or not the ratio of the size of the area occupied by the object to the size of the screen is smaller than the predetermined value.

If the detected object size is not smaller than the size obtained by multiplying the size of the reference object by N2 (NO to the step S717), the FA zoom controller 122 proceeds to the step S707, described hereinafter. On the other hand, if the detected object size is smaller than the size obtained by multiplying the size of the reference object by N2 (YES to the step S717), the FA zoom controller 122 determines whether or not the object tracking frame of the object to be tracked is contained in the zoom-in area ZI (step S718). This processing is performed to prevent the object from being framed-out due to the zoom-in operation when the object is positioned on a peripheral area of the screen. This zoom-in area ZI corresponds to the zoom-in area ZI described with reference to (B) of FIG. 6B.

If the object tracking frame is not contained in the zoom-in area ZI (NO to the step S718), the FA zoom controller 122 proceeds to the step S707, described hereinafter. On the other hand, if the object tracking frame is contained in the zoom-in area ZI (YES to the step S718), the FA zoom controller 122 starts the FA zoom-in operation, described hereinafter (step S719). This FA zoom-in operation corresponds to the zoom-in operation for the size holding control.

As described above, to prevent the object from being framed-out also in the zoom-in operation for the size holding control, the zoom-in operation is started after the object is contained in the zoom-in area ZI.

Figure 9:
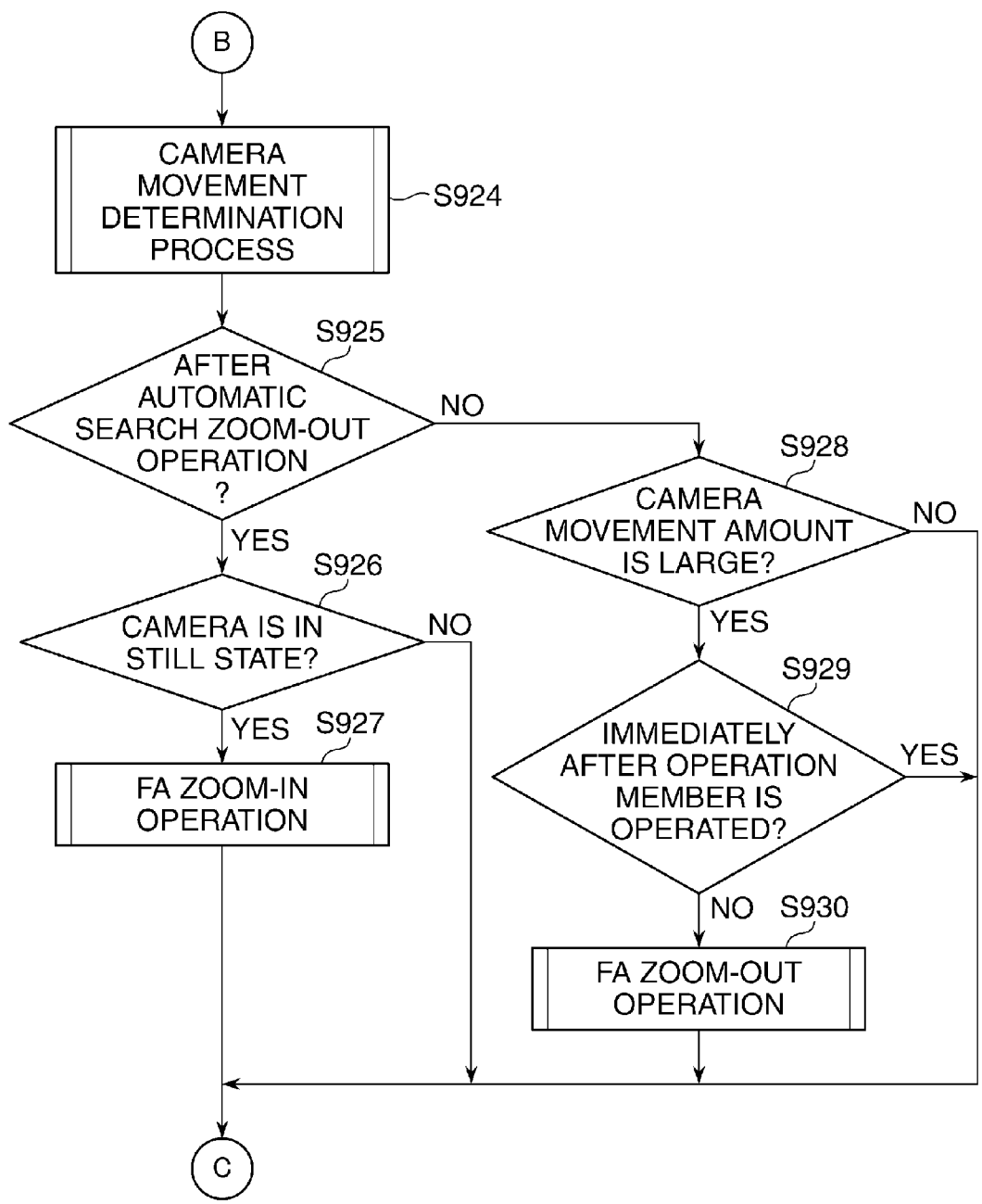
FIG. 9 is a continuation of FIG. 7A.

As described above, if it is determined in the step S704 that an object to be tracked is not detected by the object detection section 123, the FA zoom controller 122 performs a camera movement determination process in the step S924 in FIG. 9.

Although the camera movement determination process is described hereinafter, for example, in a case where the object is a person, if the object is moving with his/her face turned sideways or back, the object is sometimes not detected. In such a case, even though the object is likely to be framed-out to the outside of the screen, it is impossible to prevent frame-out by the control based on the object information. Then, if the object is framed-out, in general, the photographer performs an operation for searching for the object while panning the camera.

To cope with this, in the illustrated example, when the large movement of the camera generated by the panning operation is detected by the shake detection section 125, the FA zoom controller 122 performs a zoom-out operation. When the movement of the camera stops thereafter, the FA zoom controller 122 performs zoom-in to thereby quickly recapture the object.

In steps S925, S926, S928, and S929 following the step S924, processing for determining whether or not to start FA zoom in the automatic search mode (second mode) for assisting the recapture of the object in a case where the object is missed is performed.

The FA zoom controller 122 determines whether or not the immediately preceding zoom operation is a zoom-out operation in the automatic search mode, which is performed in a step S930, referred to hereinafter (step S925). If it is after the zoom-out operation in the automatic search mode (YES to the step S925), the FA zoom controller 122 determines whether or not the camera 100 is in a still state by referring to a determination result obtained in the step S924 (step S926).

If the camera 100 is being moved (NO to the step S926), the FA zoom controller 122 proceeds to the step S707 in FIG. 7B. On the other hand, if the camera 100 is in the still state (YES to the step S926), i.e. if it is determined that the object has been recaptured after the FA zoom-out operation, the FA zoom controller 122 starts the FA zoom-in operation (second zoom operation), described hereinafter (step S927). Then, the FA zoom controller 122 proceeds to the step S707 in FIG. 7B.

If it is not after the zoom-out operation in the automatic search mode (NO to the step S925), the FA zoom controller 122 determines whether or not the amount of the movement of the camera 100 is large by referring to the determination result obtained in the step S924 (step S928). If the amount of the movement of the camera 100 is small (NO to the step S928), the FA zoom controller 122 proceeds to the step S707 in FIG. 7B.

On the other hand, if the camera 100 has been largely moved (YES to the step S928), the FA zoom controller 122 determines whether or not it is immediately after an operation member of the operation section 117 has been operated (step S929). Here, the FA zoom controller 122 determines whether or not a predetermined time period elapses after the operation member of the operation section 117 has been operated.

If it is immediately after an operation member of the operation section 117 has been operated (YES to the step S929), i.e. if it is determined that the movement of the camera is generated by operating the operation member, and is not generated by the panning operation due to missing of the object, the FA zoom controller 122 proceeds to the step S707 in FIG. 7B. Examples of the operation member operated in this case include the FA zoom operation switch, a moving image recording start/stop switch, and the zoom lever. This prevents the FA zoom-out operation from being erroneously performed immediately after any of the operation for starting the automatic tracking mode, the operation for starting or stopping moving image recording, and the manual zoom operation.

If it is not immediately after an operation member of the operation section 117 has been operated (NO to the step S929), i.e. if it is determined that the movement of the camera is not generated by operating the operation member, the FA zoom controller 122 starts the FA zoom-out operation (first zoom operation), described hereinafter (step S930). Then, the FA zoom controller 122 proceeds to the step S707 in FIG. 7B.

After execution of the step S706, S714, S716, or S719, the FA zoom controller 122 determines in the step S707 whether or not the release switch is half-pressed (second operation), i.e. whether or not an operation for instructing still image photographing preparation is performed. If the release switch is half-pressed (YES to the step S707), the FA zoom controller 122 waits. Here, if the release switch is being continuously half-pressed, the FA zoom controller 122 temporarily stops the FA zoom operation in the automatic tracking mode and the automatic search mode. This processing is performed e.g. in a case where the photographer desires to start an FA zoom-in operation at a timing intended by the photographer after the FA zoom-out operation in the automatic search mode.

On the other hand, if the release switch is not half-pressed (NO to the step S707), the FA zoom controller 122 determines whether or not a specific operation member of the operation section 117 has been operated (third operation) (step S708). If a specific operation member has been operated (YES to the step S708), the FA zoom controller 122 clears the FA zoomed-out state (step S709). Then, the FA zoom controller 122 proceeds to a step S710, described hereinafter.

Examples of the operation of the specific operation member in this case include the operation of fully pressing the release switch (still image photographing), the operation of the moving image recording start/stop switch for starting or stopping moving image recording, and the operation of the zoom lever for a manual zoom operation. This processing is performed to prevent (restrict) an unnatural zoom operation, such as the FA zoom-in operation performed immediately after any of still image photographing, the start of moving image recoding, and the termination of moving image recording. Further, this processing is performed to give priority to the manual zoom operation of the photographer. Note that the zoomed-out state may be cleared when at least one of the above-mentioned operations is performed as the operation of the specific operation member.

If no specific operation member has been operated (NO to the step S708), the FA zoom controller 122 determines whether or not the FA zoom operation switch provided on the operation section 117 has been pressed (step S710). If the FA zoom operation switch has not been pressed (NO to the step S710), the FA zoom controller 122 returns to the step S704, and continues the FA zoom start determination.

On the other hand, if the FA zoom operation switch has been pressed (YES to the step S710), the FA zoom controller 122 measures a pressing time period over which the FA zoom operation switch has been pressed. Then, the FA zoom controller 122 determines whether or not the FA zoom operation switch has been released from the pressed state within a predetermined time period (step S711).

Figure 8:
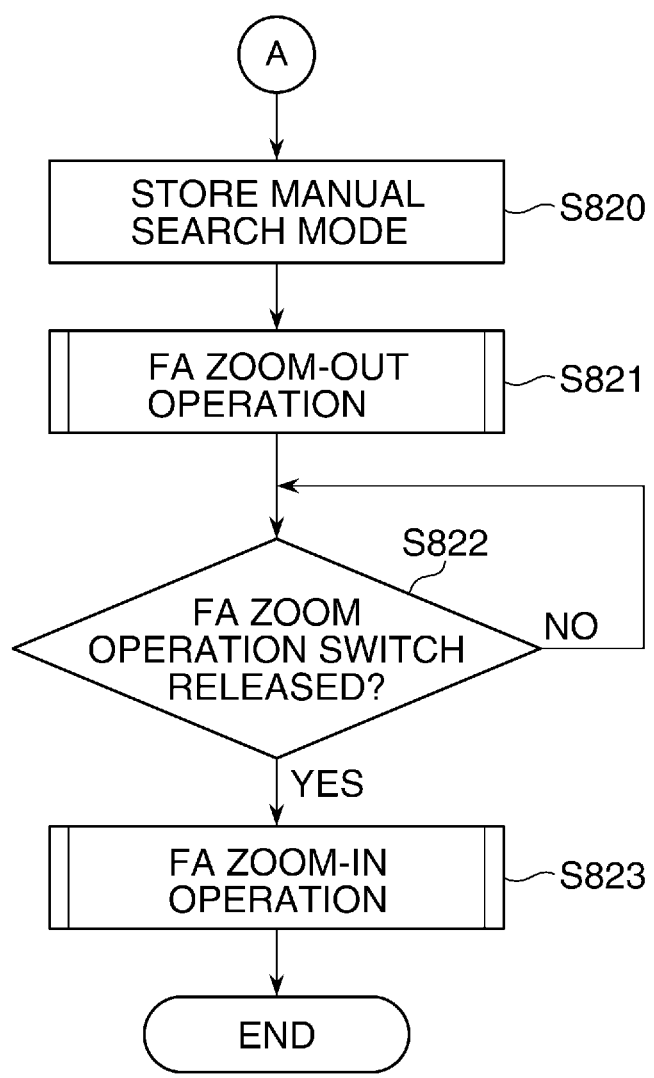
FIG. 8 is a continuation of FIG. 7B.

If the FA zoom operation switch has not been released from the pressed state within the predetermined time period (NO to the step S711), the FA zoom controller 122 changes the mode from the automatic tracking mode to the manual search mode, and proceeds to the step S820 in FIG. 8, wherein the FA zoom controller 122 starts FA zoom in the manual search mode. As a consequence, even if the object cannot be detected, when the photographer recognizes frame-out of the object, the instruction of the zoom-out operation is immediately provided in the manual search mode so as to clear the framed-out state of the object.

If the FA zoom operation switch has been released from the pressed state within the predetermined time period (YES to the step S711), i.e. if the FA zoom operation switch has been short-pressed, the FA zoom controller 122 terminates the FA zoom process.

Figure 12A:
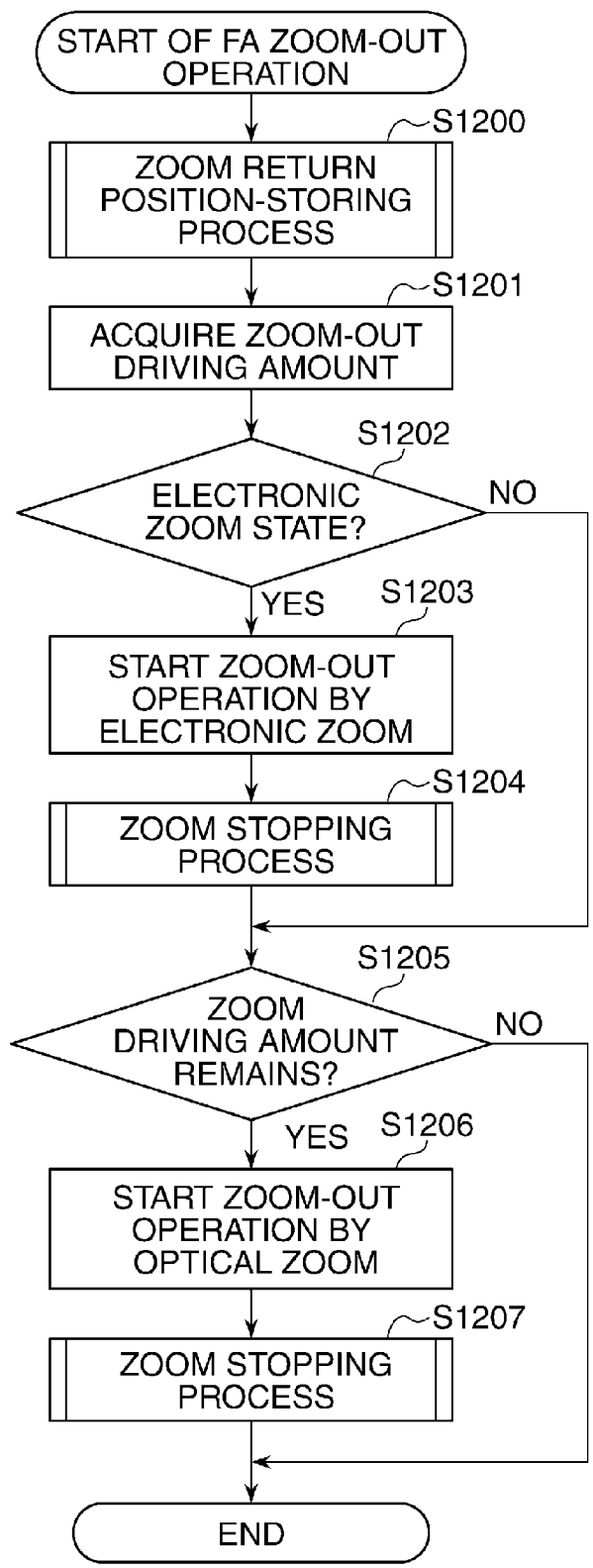
FIG. 12A is a flowchart useful in explaining an FA zoom-out operation performed in steps in FIG. 7B.
Figure 12B:
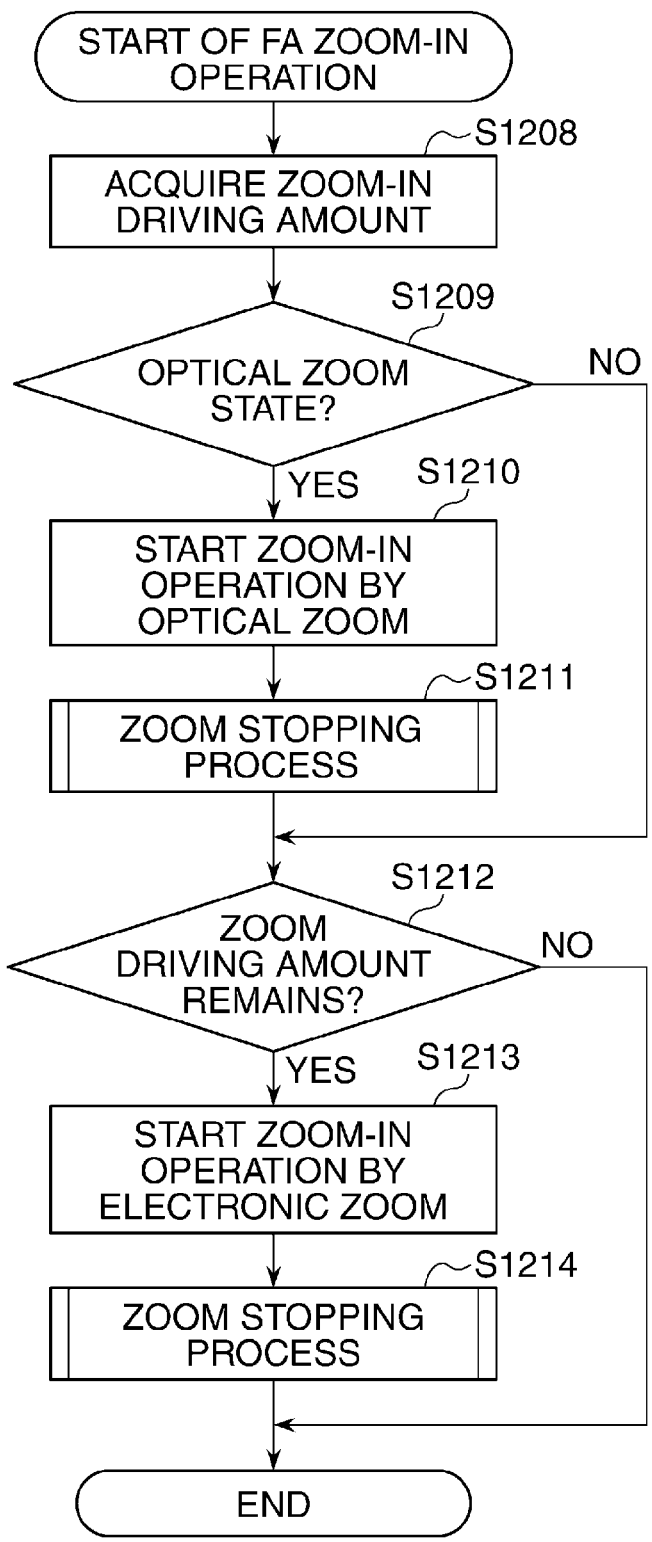
FIG. 12B is a flowchart useful in explaining an FA zoom-in operation performed in steps in FIG. 7B.

FIGS. 12A and 12B are flowcharts useful in explaining the FA zoom-out operation and the FA zoom-in operation performed by the camera 100 shown in FIG. 1, in which FIG. 12A is a flowchart useful in explaining the FA zoom-out operation, and FIG. 12B is a flowchart useful in explaining the FA zoom-in operation.

First, referring to FIG. 12A, the process in FIG. 12A is a process associated with the FA zoom-out operation performed in the steps S706 and S716 in FIG. 7B, the step S821 in FIG. 8, and the step S930 in FIG. 9.

When the FA zoom-out operation is started, a zoom return position-storing process is performed (S1200). More specifically, the FA zoom controller 122 acquires the optical zoom position from the CZ controller 119, and the electronic zoom position from the electronic zoom controller 120. Then, the FA zoom controller 122 stores the acquired optical zoom position and electronic zoom position in the memory 118 as data indicative of the zoom return position.

The optical zoom position indicates a position of the zoom lens, corresponding to a zoom magnification ratio in a range within which a change can be made by the optical zoom. Further, the electronic zoom position indicates a control position corresponding to a magnification ratio in a range within which a change for enlarging and reducing an image can be made, which can be changed by the electronic zoom. In the frame-out prevention control in the manual search mode or the automatic tracking mode, the zoom positions stored in the step S1200 are set as the zoom return position. In the automatic search mode, positions shifted from the current optical zoom position and electronic zoom position toward the wide-angle side by a predetermined amount are sometimes set as the zoom return position. The process for storing the zoom return position in the automatic search mode will be described hereinafter.

Then, the FA zoom controller 122 acquires a zoom-out driving amount (step S1201). In the manual search mode, the zoom-out driving amount is set to a predetermined driving amount stored in the memory 118. Further, this driving amount may be changed via a setting menu by an operation of the photographer. In the automatic tracking mode, the zoom-out driving amount is set according to the detected object information. For example, in the zoom-out operation for the frame-out prevention control, the zoom-out driving amount is set to a smaller amount as the object size is smaller. This makes it possible to prevent a situation in which the zoom-out operation makes the object size too small to detect the object. Note that, by taking the minimum detectable object size into consideration, the zoom-out operation may be controlled such that zoom-out is not performed in a case where the object size is smaller than a predetermined size.

Further, in the zoom-out operation for maintaining the object size, the zoom-out driving amount is set to an amount (1/N1) corresponding to a predetermined number N1 used in the step S715 in FIG. 7B. By doing so, even when the object cannot be detected, the minimum zoom-out operation can be performed until the object size becomes the size of the reference object. However, to maintain the object size to a fixed size in a case where the object is moving toward the camera 100 during the zoom-out operation, it is necessary to perform the zoom operation more than the zoom-out driving amount corresponding to the predetermined magnification, but this point will be described hereinafter.

In the automatic search mode, the zoom-out driving amount is set to a predetermined driving amount stored in the memory 118. Further, the driving amount may be changeable in accordance with a setting of the manual search mode selected from a menu of options. Further, the zoom-out driving amount may be changed according to the amount of movement of the camera 100.

Next, the FA zoom controller 122 determines whether or not the zoom state is the electronic zoom state (step S1202). In the general zoom operation, when the zoom lever of the operation section 117 is pressed, in a case where the optical zoom position is between a wide end and a tele end, the FA zoom controller 122 controls the CZ controller 119 to drive the optical zoom. In a case where the optical zoom position is at the tele end, and further, an instruction is given for operating the zoom position in the telephoto direction, the FA zoom controller 122 controls the electronic zoom controller 120 to drive the electronic zoom to thereby enable super telephotography.

To obtain consistency between the zoom operation performed by operating the zoom lever and the FA zoom operation, also in the FA zoom operation, when the zoom state is the electronic zoom state, the electronic zoom is driven first. That is, the FA zoom controller 122 determines whether or not the zoom position set when the zoom position was stored in the memory 118 is within a region of the zoom state having the priority. In the present example, the priority is given to the electronic zoom, and hence, in the step S1202, the FA zoom controller 122 determines whether or not the zoom position is in a region of the electronic zoom.

If the zoom state is the electronic zoom state (YES to the step S1202), i.e. if the zoom position at the start of FA zoom is in the region of the electronic zoom, the FA zoom controller 122 calculates a zoom-out position of the electronic zoom based on the above-mentioned electronic zoom position and the zoom-out driving amount. Then, the FA zoom controller 122 sets the calculated zoom-out position in the electronic zoom controller 120. Then, the FA zoom controller 122 instructs the electronic zoom controller 120 to perform processing for changing magnification until the zoom-out position set in the electronic zoom controller 120 is reached. Thus, the FA zoom controller 122 starts the zoom-out operation by the electronic zoom (step S1203).

The FA zoom controller 122 stops the electronic zoom controller 120 based on zoom stop determination conditions, described hereinafter, including a control state in the set mode or the automatic tracking mode and an object detection state (step S1204: zoom stopping process). This zoom stopping process will be described hereinafter.

If the zoom-out operation by the electronic zoom is stopped in the step S1204, the FA zoom controller 122 determines whether or not zoom-out of the optical zoom is required. That is, the FA zoom controller 122 determines whether or not the zoom-out driving amount remains (step S1205). Here, in a case where zoom driving with the set zoom-out driving amount cannot be sufficiently performed only by the electronic zoom, it is necessary to make up for the remaining zoom-out driving amount by the optical zoom. Therefore, the FA zoom controller 122 determines whether or not the zoom-out driving amount remains.

If the zoom state is not the electronic zoom state (NO to the step S1202), i.e. if the zoom position at the start of FA zoom is in a region of the optical zoom, the FA zoom controller 122 proceeds to the step S1205.

If it is determined that zoom-out by the optical zoom is required (YES to the step S1205), the FA zoom controller 122 calculates a zoom-out position of the optical zoom based on the optical zoom position and the zoom-out driving amount, and sets the calculated zoom-out position in the CZ controller 119. Then, the FA zoom controller 122 instructs the CZ controller 119 to drive the zoom until the zoom-out position of the optical zoom set in the CZ controller 119 is reached. In response to this instruction, the CZ controller 119 causes the zoom lens controller 113 to start a zoom-out operation by the optical zoom (step S1206).

Then, the FA zoom controller 122 stops the CZ controller 119 according to the zoom stop determination conditions, described hereinafter (step 1207: zoom stopping process). Then, when the zoom-out operation by the optical zoom is stopped in the step S1207, the FA zoom controller 122 terminates the FA zoom-out operation. Note that if it is determined that the zoom-out operation by the optical zoom is not required (NO to the step S1205), the FA zoom controller 122 immediately terminates the FA zoom-out operation.

Next, referring to FIG. 12B, the process in FIG. 12B is a process associated with the FA zoom-in operation performed in the steps S714 and S719 in FIG. 7B, the step S823 in FIG. 8, and the step S927 in FIG. 9.

When the FA zoom-in operation is started, the FA zoom controller 122 acquires the zoom-in driving amount (step S1208). In the manual search mode, the zoom-in driving amount is set to a driving amount by which the zoom-in operation is performed until the zoom return position stored in the memory 118 in the step S1200 in FIG. 12A is reached. Also in the zoom-in operation for the frame-out prevention control in the automatic tracking mode and the zoom-in operation in the automatic search mode, the zoom-in driving amount is set to a driving amount by which the zoom-in operation is performed until the zoom return position stored in the memory 118 in the step S1200 in FIG. 12A is reached.

On the other hand, in the zoom-in operation for the size holding control in the automatic tracking mode, the zoom-in driving amount is set to a zoom-in driving amount corresponding to a predetermined number N2 used in the step S717 in FIG. 7B (1/N2 times).

Then, the FA zoom controller 122 determines whether or not the zoom state is the optical zoom state (step S1209). If the zoom state is the optical zoom state (YES to the step S1209), to preferentially perform the zoom-in operation by the optical zoom, the FA zoom controller 122 calculates a zoom-in position of the optical zoom based on the optical zoom position and the zoom-in driving amount. Then, the FA zoom controller 122 sets the calculated zoom-in position in the CZ controller 119. Then, the FA zoom controller 122 instructs the CZ controller 119 to drive the zoom until the zoom-in position set in the CZ controller 119 is reached. In response to this instruction, the CZ controller 119 causes the zoom lens-driving section 113 to start a zoom-in operation by the optical zoom (step S1210).

The FA zoom controller 122 stops the CZ controller 119 based on the zoom stop determination conditions (step 1211: zoom stopping process). Then, when the zoom-in operation by the optical zoom is stopped in the step S1211, the FA zoom controller 122 determines whether or not zoom-in by the electronic zoom is required. That is, the FA zoom controller 122 determines whether or not the zoom-in driving amount remains (step S1212).

Note that if the zoom state is not the optical zoom state (NO to the step S1209), to perform zoom-in only by the electronic zoom, the FA zoom controller 122 proceeds to the step S1212.

If it is determined that zoom-in by the electronic zoom is required (YES to the step S1212), the FA zoom controller 122 calculates a zoom-in position of the electronic zoom based on the zoom-in driving amount, and sets the calculated zoom-in position in the electronic zoom controller 120. Then, the FA zoom controller 122 instructs the electronic zoom controller 120 to perform processing for changing magnification until the zoom-in position of the electronic zoom set in the electronic zoom controller 120 is reached. This causes the FA zoom controller 122 to start a zoom-in operation by the electronic zoom (step S1213).

Then, the FA zoom controller 122 stops the electronic zoom controller 120 according to the zoom stop determination conditions, described hereinafter (step S1214: zoom stopping process). Then, when the zoom-in operation by the electronic zoom is stopped in the step S1214, the FA zoom controller 122 terminates the FA zoom-in operation. Note that if it is determined that the zoom-in operation by the electronic zoom is not required (NO to the step S1212), the FA zoom controller 122 immediately terminates the FA zoom-in operation.

Figure 13:
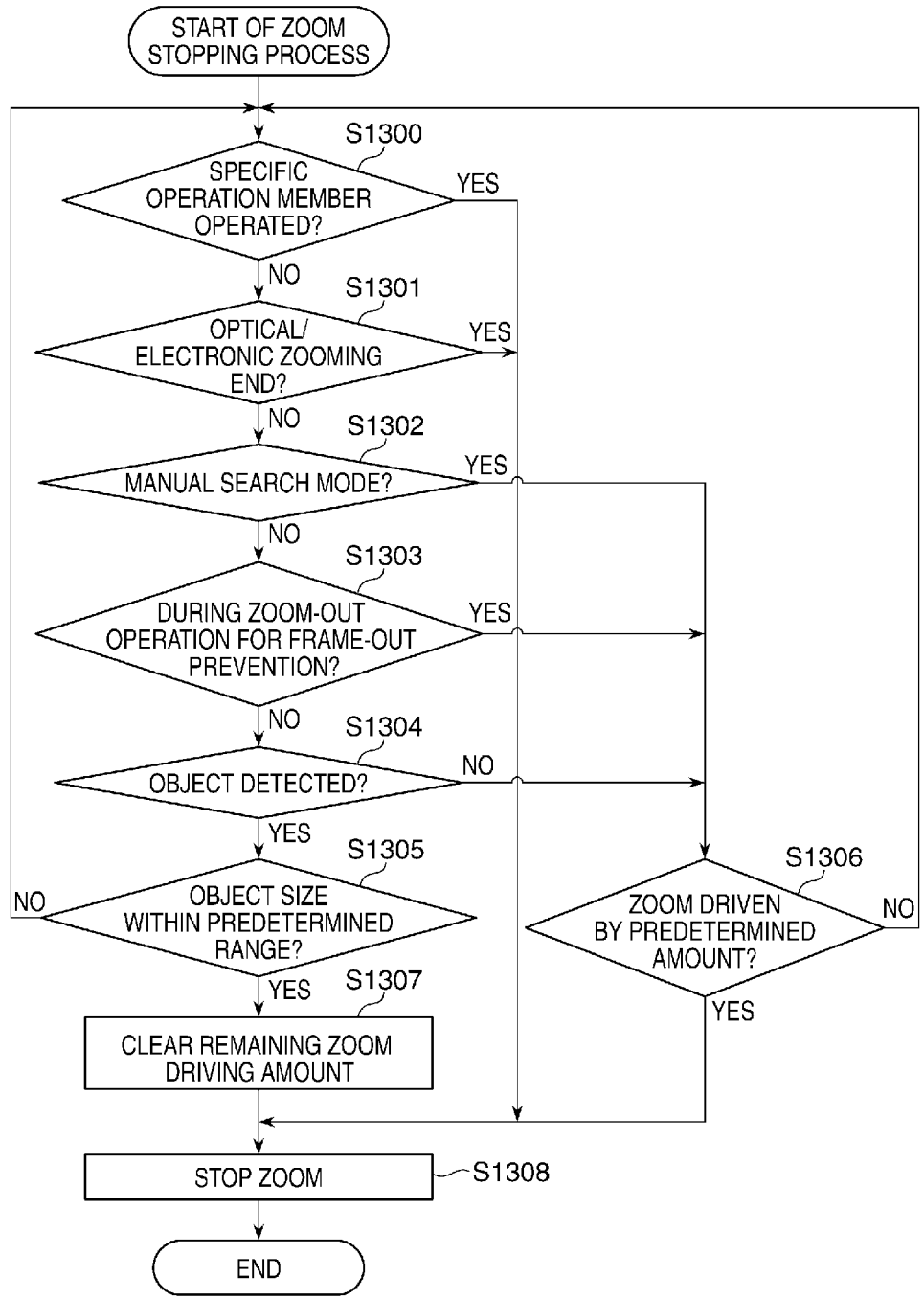
FIG. 13 is a flowchart of a zoom stopping process performed in steps in FIGS. 12A and 12B.

FIG. 13 is a flowchart of the zoom stopping process. The zoom stopping process shown in FIG. 13 is performed in the steps S1204 and S1207 in FIG. 12A, and the steps S1211 and S1214 in FIG. 12B.

When the zoom stopping processing is started, the FA zoom controller 122 determines whether or not a specific operation member of the operation section 117 has been operated (step S1300). If a specific operation member has been operated (YES to the step S1300), the FA zoom controller 122 stops the zoom operation (step S1308). Then, the FA zoom controller 122 terminates the zoom stopping process.

Note that examples of the operation of the specific operation member include the operation of fully pressing the release switch (still image photographing), the operation of the moving image recording start/stop switch for starting or stopping moving image recording, and the operation of the zoom lever for a manual zoom operation. The zoom stopping process is, for example, performed to prevent (restrict) an unnatural zoom operation, such as the FA zoom-in operation performed immediately after any of still image photographing, the start of moving image recoding, and the termination of moving image recording. Further, the zoom stopping process is performed to give priority to the manual zoom operation of the photographer.

If no specific operation member has been operated (NO to the step S1300), the FA zoom controller 122 acquires the optical zoom position from the CZ controller 119 in a case where the zoom operation is the optical zoom operation. On the other hand, in a case where the zoom operation is the electronic zoom operation, the FA zoom controller 122 acquires the electronic zoom position from the electronic zoom controller 120. Then, the FA zoom controller 122 determines whether or not the zoom position has reached the optical zoom wide end (in a case where the zoom operation is the zoom-out operation) or the electronic zoom tele end (in a case where the zoom operation is the zoom-in operation) (step S1301).

If the zoom position has reached the zoom end (YES to the step S1301), the FA zoom controller 122 proceeds to the step S1308. On the other hand, if the zoom position has not reached the zoom end (NO to the step S1301), the FA zoom controller 122 acquires mode information stored in the memory 118 in the step S702 in FIG. 7A or in the step S820 in FIG. 8. Then, the FA zoom controller 122 determines whether the current mode is the manual search mode or the automatic tracking mode (step S1302).

If the current mode is not the manual search mode (NO to the step S1302), i.e. if the current mode is the automatic tracking mode, the FA zoom controller 122 determines which zoom operation is being performed in the automatic tracking mode (step S1303). Here, the FA zoom controller 122 determines e.g. whether or not it is during the zoom-out operation for the frame-out prevention control.

If it is not during the zoom-out operation for the frame-out prevention control (NO to the step S1303), the FA zoom controller 122 determines whether or not the object has been detected by the object detection section 123 (step S1304).

If the object has been detected (YES to the step S1304), the FA zoom controller 122 compares the object size in the reference object information (reference object size) and the object size detected in the step S1304 (detected object size). Then, the FA zoom controller 122 determines whether or not a difference between the detected object size and the reference object size is within a predetermined range (not larger than a predetermined amount of change) (step S1305).

If the difference is not within the predetermined range (NO to the step S1305), the FA zoom controller 122 returns to the step S1300 to continue the zoom stop determination. On the other hand, if the difference is caused to be within the predetermined range by the zoom operation (YES to the step S1305), the FA zoom controller 122 clears (nullifies) the remaining driving amount (step S1307). After that, the FA zoom controller 122 proceeds to the step S1308.

In the step S1307, even when the zoom is not driven by the zoom driving amount acquired in the step S1201 in FIG. 12A or the step S1208 in FIG. 12B, the FA zoom controller 122 clears the remaining zoom driving amount. As a consequence, the answer to the question of the step S1205 or S1212 becomes negative "NO", whereby the zoom operation is terminated.

If the current mode is the manual search mode (YES to the step S1302), the FA zoom controller 122 determines whether or not the zoom has been driven by the zoom driving amount associated with each zoom operation based on the zoom driving amount acquired in the step S1201 in FIG. 12A or in the step S1208 in FIG. 12B (step S1306). If the zoom has not been driven by the zoom driving amount (NO to the step S1306), the FA zoom controller 122 returns to the step S1300 to continue the zoom stop determination.

On the other hand, if the zoom has been driven by the zoom driving amount (YES to the step S1306), the FA zoom controller 122 proceeds to the step S1308 to stop the zoom operation. Note that if it is during the zoom-out operation for the frame-out prevention control (YES to the step S1303), the FA zoom controller 122 proceeds to the step S1306. Further, if the object is not detected (NO to the step S1304), the FA zoom controller 122 proceeds to the step S1306.

Figure 14A:
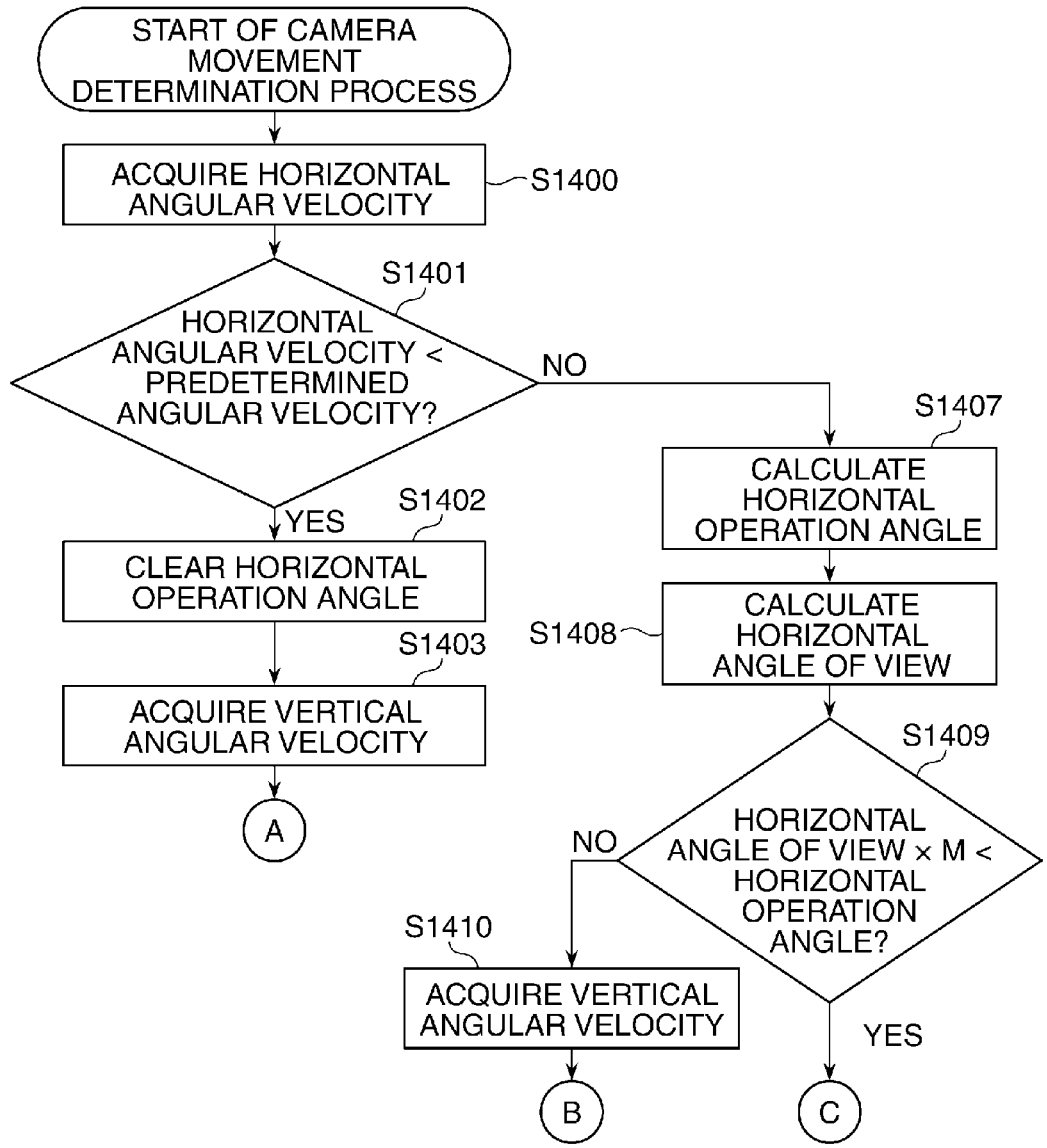
FIG. 14A is a flowchart of a camera movement determination process performed in a step in FIG. 9.
Figure 14B:
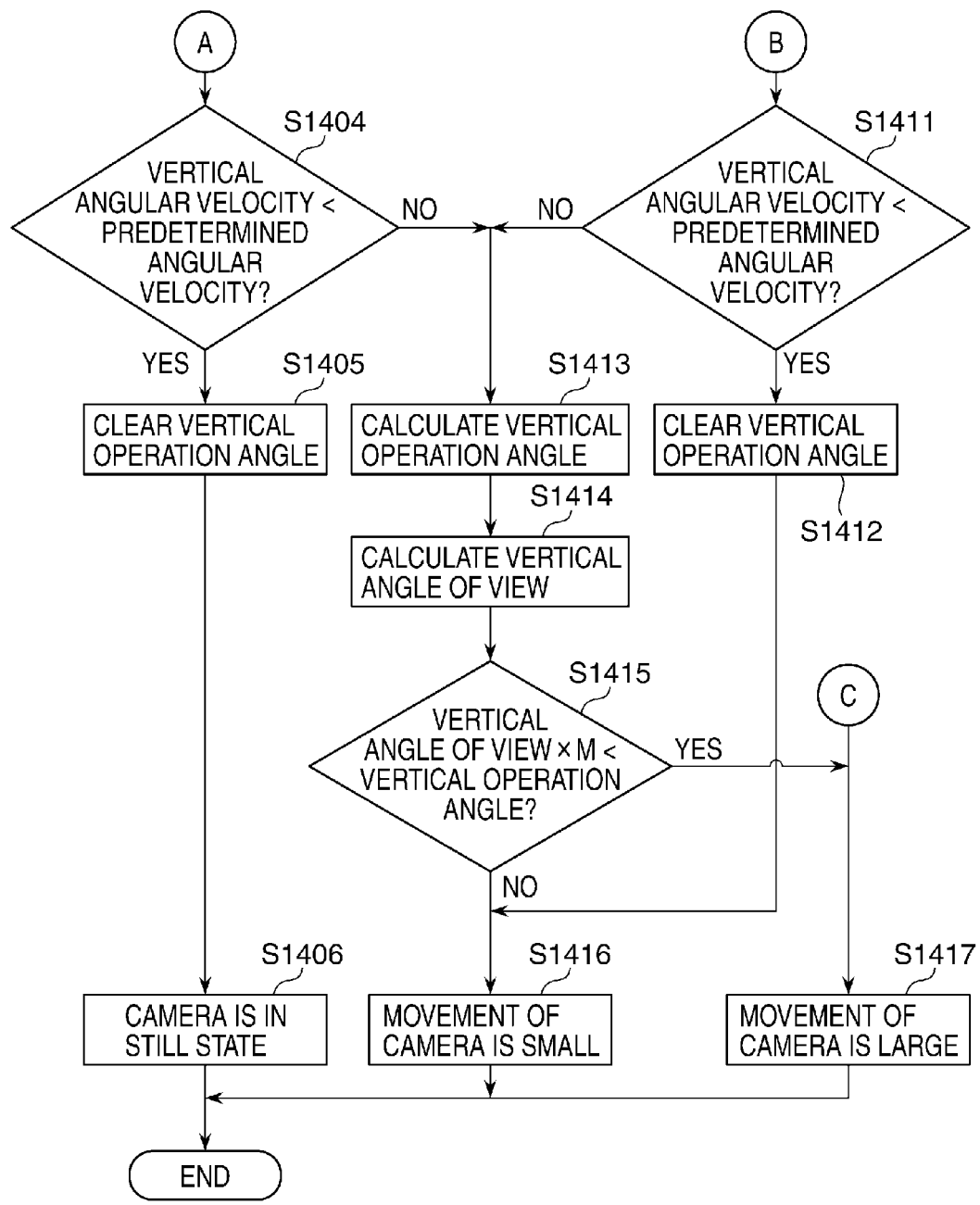
FIG. 14B is a continuation of FIG. 14A.

FIGS. 14A and 14B are a flowchart of the camera movement determination process performed in the step S924 in FIG. 9.

When the camera movement determination process is started, the FA zoom controller 122 acquires an angular velocity in the horizontal direction (horizontal angular velocity) from the shake detection section 125 (step S1400). Then, the FA zoom controller 122 determines whether or not the horizontal angular velocity is lower than a predetermined angular velocity (step S1401).

If the horizontal angular velocity is lower than the predetermined angular velocity (YES to the step S1401), the FA zoom controller 122 clears a horizontal operation angle, referred to hereinafter (step S1402). The step S1402 is executed in order to determine a horizontal operation angle, as movement of the camera, by setting a horizontal operation angle obtained when the horizontal angular velocity is small, i.e. when the camera 100 is in the still state, to 0°, and using this angle as the reference.

Then, the FA zoom controller 122 acquires an angular velocity in the vertical direction (vertical angular velocity) from the shake detection section 125 (step S1403). Then, the FA zoom controller 122 determines whether or not the vertical angular velocity is lower than a predetermined angular velocity (step S1404). If the vertical angular velocity is lower than the predetermined angular velocity (YES to the step S1404), the FA zoom controller 122 clears a vertical operation angle, referred to hereinafter (step S1405). Then, the FA zoom controller 122 determines that the camera 100 is in the still state (step S1406), followed by terminating the camera movement determination process.

If the horizontal angular velocity is not lower than the predetermined angular velocity (NO to the step S1401), the FA zoom controller 122 calculates an operation angle in the horizontal direction (step S1407).

Now, assuming that the horizontal angular velocity is ωh and the control period is ΔT, an angle in the horizontal direction through which the camera is moved over the control period ΔT can be calculated by ωh×ΔT. Further, by adding up the past horizontal operation angles, i.e. integrating the horizontal angular velocity, with the angle in the horizontal direction in a state in which the camera 100 was stopped immediately before being set to 0°, it is possible to calculate the horizontal operation angle through which the camera is moved from this state in the horizontal direction.

Then, the FA zoom controller 122 calculates a horizontal angle of view (step S1408). In doing this, the FA zoom controller 122 acquires information indicative of the focal length from the zoom lens-driving section 113 via the CZ controller 119. Further, the FA zoom controller 122 calculates the horizontal angle of view based on the horizontal size of the image pickup device 106.

Now, assuming that the focal length is f, and the horizontal size of the image pickup device 106 is h, the horizontal angle of view can be calculated by 2×arctan(2h/f).

Next, the FA zoom controller 122 determines whether or not the horizontal operation angle is larger than an angle calculated by multiplying the horizontal angle of view by a predetermined value M (M>0) (step S1409). If the horizontal operation angle is not larger than the angle calculated by multiplying the horizontal angle of view by M (NO to the step S1409), the FA zoom controller 122 acquires the vertical angular velocity in the same manner as in the step S1403 (step S1410). Further, the FA zoom controller 122 determines whether or not the vertical angular velocity is lower than the predetermined angular velocity in the same manner as in the step S1404 (step S1411). Then, if the vertical angular velocity is lower than the predetermined angular velocity (YES to the step S1411), the FA zoom controller 122 clears the vertical operation angle in the same manner as in the step S1405 (step S1412). After that, the FA zoom controller 122 proceeds to a step S1416, referred to hereinafter.

If the vertical angular velocity is not lower than the predetermined angular velocity (NO to the step S1411), the FA zoom controller 122 performs calculation, with respect to the vertical direction, in the same manner as in the step S1407 to thereby calculate the vertical operation angle (step S1413).

Assuming that the vertical angular velocity is ωv and the control period is ΔT, an angle in the vertical direction through which the camera is moved over the control period ΔT can be calculated by ωv×ΔT. Further, by adding up the past vertical operation angles, i.e. integrating the vertical angular velocity, with the angle in the vertical direction in a state in which the camera 100 was stopped immediately before being set to 0°, it is possible to calculate the vertical operation angle through which the camera is moved from this state in the vertical direction.

Next, the FA zoom controller 122 performs calculation, with respect to the vertical direction, in the same manner as in the step S1408 to thereby calculate the vertical angle of view (step S1414). In doing this, the FA zoom controller 122 acquires information indicative of the focal length from the zoom lens-driving section 113 via the CZ controller 119. Further, the FA zoom controller 122 calculates the vertical angle of view based on the vertical size of the image pickup device 106. Assuming that the focal length is f and the vertical size of the image pickup device 106 is v, the vertical angle of view can be calculated by 2×arctan(2v/f).

Then, the FA zoom controller 122 determines whether or not the vertical operation angle is larger than an angle calculated by multiplying the vertical angle of view by a predetermined value M (step S1415).

If the vertical operation angle is not larger than the angle calculated by multiplying the vertical angle of view by the predetermined value M (NO to the step S1415), the FA zoom controller 122 determines that the amount of movement of the camera 100 is small (step 1416), followed by terminating the camera movement determination process. On the other hand, if the vertical operation angle is larger than the angle calculated by multiplying the vertical angle of view by the predetermined value M (YES to the step S1415), the FA zoom controller 122 determines that the object is out of the angle of view, and hence that the camera is being moved by an angle larger than the angle of view. Then, the FA zoom controller 122 determines that the amount of movement of the camera 100 is large (step 1417), followed by terminating the camera movement determination process.

If the horizontal operation angle is larger than the angle obtained by multiplying the horizontal angle of view by M (YES to the step S1409), the FA zoom controller 122 determines that the amount of movement of the camera 100 is large (step 1417), followed by terminating the camera movement determination process. Note that if it is determined in the step S1404 that the vertical angular velocity is not lower than the predetermined angular velocity (NO to the step S1404), the FA zoom controller 122 proceeds to the step S1413.

Although in the illustrated example, as results of determination of the movement of the camera 100, there are shown three determination results: "camera in still state" (step S1406), "camera movement small" (step S1416), and "camera movement large" (step S1417), the results of determination are not necessarily limited to these three. Further, by always performing the camera movement determination process for the camera 100, the determination result may be acquired in the step S924 in FIG. 9.

Now, movement detection sensitivity will be described. The movement detection sensitivity corresponds to the predetermined angular velocity used in the steps S1401, S1404, and S1411 in FIGS. 14A and 14B, and the predetermined value M used in the steps S1409 and S1415 in the same. As the predetermined angular velocity and the predetermined value M (i.e. set values) are smaller, the response speed at the start of the FA zoom-out operation is higher. That is, the movement detection sensitivity becomes higher. Further, the set values are larger, the response speed is lower, and the movement detection sensitivity becomes lower.

When the movement detection sensitivity is set to "high", the zoom operation can be performed in response to a small movement of the camera, but an erroneous operation is liable to occur. On the other hand, when the movement detection sensitivity is set to "low", the zoom operation may not be performed even if the camera is panned. Therefore, the movement detection sensitivity may be changed according to the settings and recording state of the camera. For example, the movement detection sensitivity may be changed according to the setting of the photographing mode (such as a portrait mode and a sport mode), or may be changed between a state in which a moving image is being recorded and a state in which a photographer is performing framing for still image photographing. Further, the movement detection sensitivity may be changed from a setting menu, described hereinafter.

FIG. 15 is a flowchart of the zoom return position-storing process which is performed in the automatic search mode in the step S1200 in FIG. 12A.

In general, the zoom return position is set to the optical zoom position acquired from the CZ controller 119 and the electronic zoom position acquired from the electronic zoom controller 120 when the FA zoom-out operation is started. However, in a case where an object has moved toward the camera 100 after the zoom-out operation, when the zoom position is returned to the zoom position stored at the start of the FA zoom-out operation, the image may be excessively zoomed in. In this case, when the camera 100 is panned again, i.e. when the FA zoom operation in the automatic search mode is performed, by shifting the zoom return position to the wide angle side by a predetermined amount, the angle of view can be easily corrected.

When the zoom return position-storing process is started, the FA zoom controller 122 determines whether or not the immediately preceding zoom operation is the FA zoom-in operation performed in the step S714 or S719 in FIG. 7B, or the step S927 in FIG. 9 (step S1500). If the immediately preceding zoom operation is the FA zoom-in operation (YES to the step S1500), the FA zoom controller 122 acquires a completion time, stored in the memory 118 in advance, at which the immediately preceding FA zoom-in operation was completed (step S1501).

Then, the FA zoom controller 122 acquires a time to start the FA zoom-out operation in the automatic search mode, i.e. the start time of the zoom return position-storing process (step S1502). Then, the FA zoom controller 122 determines whether or not a zoom time difference between the FA zoom-in operation completion time and the FA zoom-out operation start time is smaller than a predetermined time period (step S1503).

If the zoom time difference is not smaller than the predetermined time period (NO to the step S1503), the FA zoom controller 122 sets the zoom return position to the optical zoom position acquired from the CZ controller 119 and the electronic zoom position acquired from the electronic zoom controller 120 (step S1504). On the other hand, if the zoom time difference is smaller than the predetermined time period (YES to the step S1503), i.e. if the FA zoom-out operation is performed again immediately after the FA zoom-in operation, the FA zoom controller 122 sets the zoom return position to positions shifted from the optical zoom position and the electronic zoom position to the wide angle side by an amount of multiplication by $1/K$ ($K>1$) (step S1505).

After execution of the step S1504 or S1505, the FA zoom controller 122 stores the zoom return position in the memory 118 (step S1506), followed by terminating the zoom return position-storing process in the automatic search mode.

Note that if the zoom operation is not the FA zoom-in operation (NO to the step S1500), i.e. if the immediately preceding zoom operation is the FA zoom-out operation or a zoom operation by operating the zoom lever, the FA zoom controller 122 proceeds to the step S1504.

FIGS. 16A to 16D are diagrams useful in explaining a setting menu displayed on the display section 109 appearing in FIG. 1, each showing an example of settings of framing assist (FA) zoom.

The items which can be set on the setting menu include, for example, the zoom-out driving amount (zoom operation amount) of the FA zoom-out operation, the mode setting of the automatic tracking mode and the automatic search mode, and the movement detection sensitivity in the automatic search mode.

The item of "zoom-out amount (zoom-out driving amount)" indicates the zoom-out driving amount acquired in the step S1201 in FIG. 12A. For example, the magnification ratios of 1/6, 1/4, and 1/2 to the zoom-in view angle are stored in the memory 118 in advance in association with the settings of "large", "medium", and "small", respectively. This makes it possible to acquire a zoom-out driving amount according to a setting selected from the menu options of "large", "medium", and "small".

In the item of "automatic mode setting", as to the automatic tracking mode and the automatic search mode, on/off is set on a mode-by-mode basis, to thereby set whether or not to enable each mode.

Figure 16A:
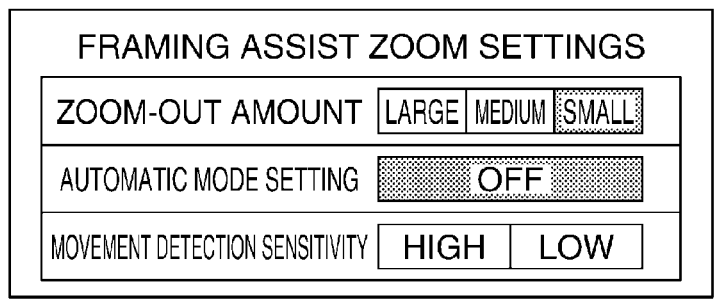
FIGS. 16A to 16D are diagrams useful in explaining a setting menu displayed on a display section appearing in FIG. 1, each showing an example of settings of framing assist zoom.

The illustrated example in FIG. 16A shows a state in which the automatic tracking mode and the automatic search mode are both set to "OFF". In this case, even when the FA zoom operation switch is short-pressed in the step S701 in FIG. 7A, the FA zoom controller 122 does not proceed to the processes for the automatic tracking mode and the automatic search mode in the step S702 et seq.

Figure 16B:
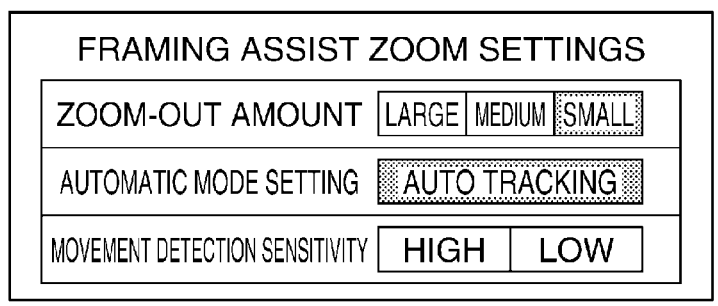

The illustrated example in FIG. 16B shows a state in which only the automatic tracking mode is set to "ON". In this case, even when an object cannot be detected in the step S703 in FIG. 7A, the FA zoom controller 122 does not proceed to the process for the automatic search mode from the step S924 in FIG. 9 et seq.

Figure 16C:
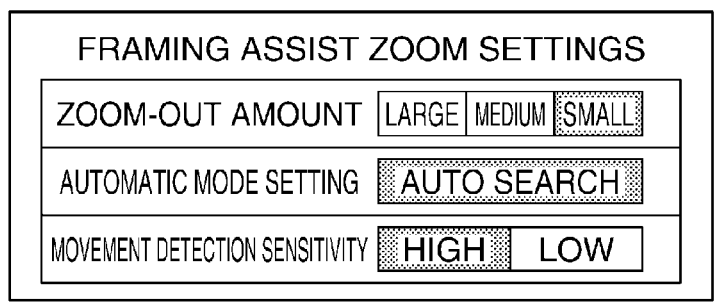

The illustrated example in FIG. 16C shows a state in which only the automatic search mode is set to "ON". In this case, the step S703 (object designation process) in FIG. 7A is not executed, and even when an object is detected, the FA zoom controller 122 does not proceed to the process for the automatic tracking mode from the step S705 et seq.

Figure 16D:
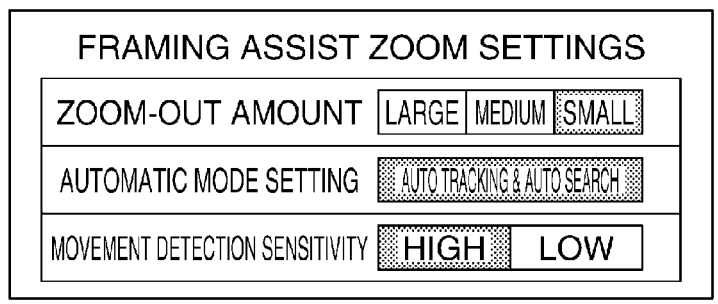

The illustrated example in FIG. 16D shows a state in which the automatic tracking mode and the automatic search mode are both set to "ON". In this case, the FA zoom controller 122 executes all of the steps in FIGS. 7A and 7B.

In setting the movement detection sensitivity, the movement detection sensitivity can be set when the automatic search mode is set to "ON". The predetermined angular velocity used in the step S1401, S1404, or S1411 in FIGS. 14A and 14B, and the predetermined value M used in the step S1409 or S1415 in the same can be set.

For example, when the movement detection sensitivity is set to "high", the predetermined angular velocity and the predetermined value M are set to small values, whereas when the movement detection sensitivity is set to "low", the predetermined angular velocity and the predetermined value M are set to large values.

Thus, the detection sensitivity of the panning operation in the automatic search mode can be changed from the setting menu in accordance with a scene to be photographed and a photographer's taste. Note that the movement detection sensitivity is set not only to "high" and "low", but three or more optional settings may be provided. Further, only one of the predetermined angular velocity and the predetermined value M may be changed.

Next, a description will be given of a process performed when it is determined in the step S752 in FIG. 7A that the movement of the camera is large.

Figure 17A:
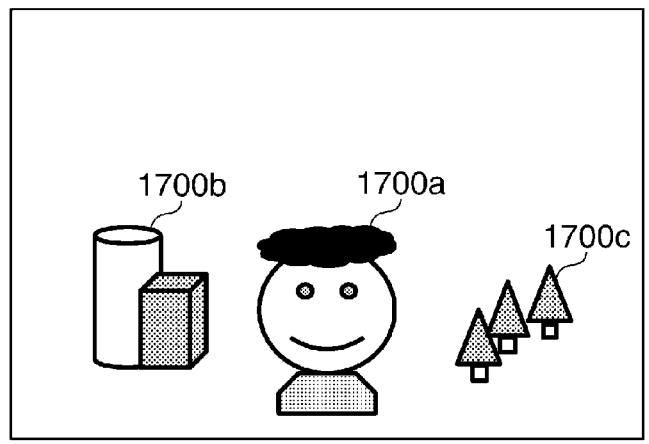
Figure 17B:
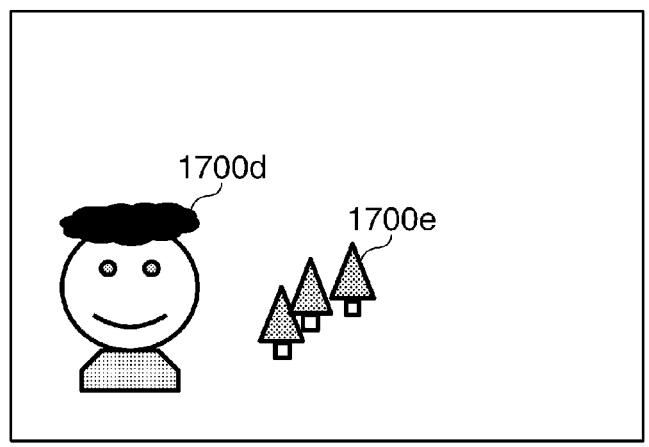
Figure 17C:
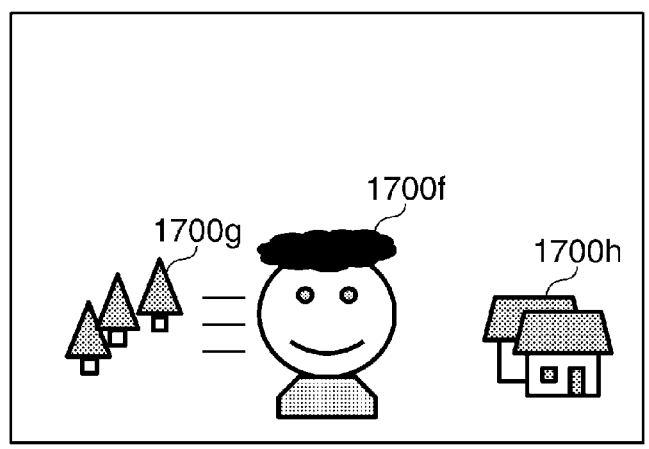

FIGS. 17A to 17C are diagrams useful in explaining a screen displayed on the display section 109 when the movement of the camera 100 shown in FIG. 1 is large. 17A shows an example of an image displayed on the display section, FIG. 17B shows an image displayed when a predetermined time period has elapsed from when the image is in the state shown in FIG. 17A, and FIG. 17C shows an image displayed when a predetermined time period has elapsed from when the image is in the state shown in FIG. 17B.

Referring to FIG. 17A, a main object 1700a is present on the screen, and background objects 1700b and 1700c are also present.

Figure 18:
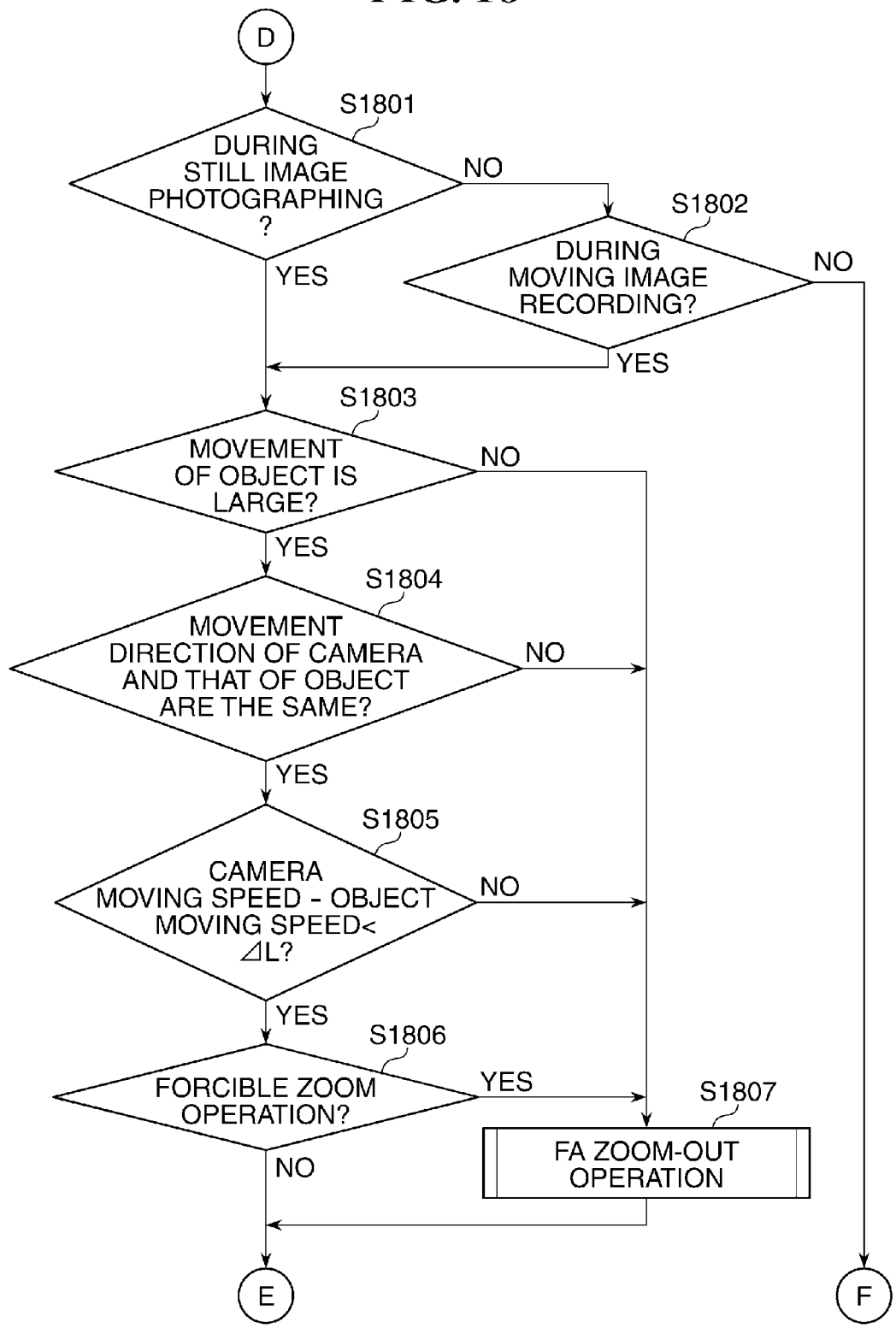
FIG. 18 is a flowchart of a process performed when it is determined in a step in FIG. 7A that a movement of the camera is large.

FIG. 18 is a flowchart of the process performed when it is determined in the step S752 in FIG. 7A that the movement of the camera is large.

First, the FA zoom controller 122 determines whether or not the camera 100 is photographing a still image (step S1801). If the camera 100 is not photographing a still image (NO to the step S1801), the FA zoom controller 122 determines whether or not the camera 100 is recording a moving image (step S1802). If the camera 100 is not recording a moving image (NO to the step S1802), the FA zoom controller 122 proceeds to the step S705 in FIG. 7B.

Note that in the process in FIG. 18, determination of whether or not the camera 100 is photographing a still image and determination of whether or not the camera 100 is recording a moving image (i.e. whether or not the camera setting is changed) are performed to prevent automatic FA from being erroneously started in a case where the camera 100 and an object both move, such as panning photographing. If the camera is on standby, even when automatic FA operates at a timing which is not intended by a user, the user hardly suffers disadvantages.

If the camera 100 is photographing a still image (YES to the step S1801), the FA zoom controller 122 determines whether or not the main object has moved over a predetermined distance or more (step S1803). That is, the FA zoom controller 122 determines whether or not the movement of the main object is large. Note that if the camera 100 is recording a moving image (YES to the step S1802), the FA zoom controller 122 proceeds to the step S1803.

If the movement of the main object is small (NO to the step S1803), the FA zoom controller 122 proceeds to a step S1807, described hereinafter. On the other hand, if the movement of the main object is large (YES to the step S1803), the FA zoom controller 122 determines whether or not the direction in which the camera 100 has been moved is the same as the direction in which the object has moved (step S1804). If the direction in which the camera 100 has been moved is the same as the direction in which the object has moved (NO to the step S1804), the FA zoom controller 122 proceeds to the step S1807.

Note that it is assumed here that the camera 100 is also being moved, and if the moving speeds of the object and the camera 100 are the same, it is difficult to determine whether or not the object has moved. In view of this, in the illustrated example, determination of whether or not the main object has moved is performed based on a positional relationship between the main object and the background objects, displayed on the display section 109.

For example, let it be assumed that the camera 100 is moved to the right from the state shown in FIG. 17A, and the screen (image) displayed on the display section 109 after the elapse of a time period Δt1 shows the state shown in FIG. 17B. In this case, the relationship between a main object, denoted by reference numeral 1700d, and a background object, denoted by reference numeral 1700e, is the same as the relationship between the main object, denoted by reference numeral 1700a, and the background object, denoted by reference numeral 1700c, which is the layout before the elapse of the time period Δt1, and hence it is considered that the main object has not particularly moved, but the camera 100 has been moved from left to right.

Next, let it be assumed that the screen displayed on the display section 109 after the elapse of a time period Δt2 shows the state shown in FIG. 17C. In this case, the relationship between the main object, denoted by reference numeral 1700f, and the background object, denoted by reference numeral 1700g, and a background object, denoted by background object 1700h, differs from the relationship between the main object 1700a and a background object, denoted by reference numeral 1700b, and the background object 1700c, which is the layout before the elapse of the time period Δt2. Particularly, the background object 1700c is located on the right side of the main object 1700a, but the same background object (background object denoted by reference numeral 1700g) is located on the left side of the main object 1700f after the elapse of the time period Δt2. From the above, it is considered that the main object has also moved from left to right, as the camera 100 has been moved.

If the direction in which the camera 100 has been moved is the same as the direction in which the object has moved (YES to the step S1804), the FA zoom controller 122 calculates a difference in moving speed between the camera 100 and the main object. Then, the FA zoom controller 122 determines whether or not the calculated difference is smaller than a predetermined threshold value ΔL (step S1805).

If the difference≥ΔL holds (NO to the step S1805), the FA zoom controller 122 proceeds to the step S1807. On the other hand, if the difference<ΔL holds (YES to the step S1805), i.e. in a case where the zoom driving mode is inactive, the FA zoom controller 122 determines whether or not a forcible zoom operation (also referred to as the forcible zoom start operation) has been performed (step S1806). The forcible zoom operation is performed when the photographer desires to cause the camera to perform zoom-out.

If the forcible zoom operation has not been performed (NO to the step S1806), the FA zoom controller 122 proceeds to the step S708 in FIG. 7B. On the other hand, if the forcible zoom operation has been performed (YES to the step S1806), the FA zoom controller 122 performs the above-described FA zoom-out operation (step S1807: execution of the zoom driving mode). Then, the FA zoom controller 122 proceeds to the step S708 in FIG. 7B.

As described above, in the embodiment of the present invention, even in a state in which an object is framed-out to be undetectable, it is possible to quickly recapture the object within the angle of view, and assist comfortable framing. Further, determination is made not only as to the movement of the camera, but also as to the movement of the object (main object), which is determined based on a correlation with background objects. Then, in a case where the camera and the object both move in the same direction at the same speed, the zoom-out operation is not performed. This makes it possible to prevent the automatic FA from being erroneously started during photographing, such as panning photographing.

Note that the present invention may be applied to not only to adjustment of the angle of view for still image photographing, but also to adjustment of the angle of view for moving image recording.

The control of the system controller may be performed by one hardware unit, or the overall operation of the apparatus may be controlled by a plurality of hardware units that share processing operations.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

Although in the above-described embodiment, the description is given of the case where the present invention is applied to the digital camera by way of example, this is not limitative, but the present invention can be applied to any other apparatus insofar as it includes image pickup means. That is, the present invention can be applied not only to a PDA and a mobile phone terminal, equipped with a camera, but also to an apparatus incorporating an image pickup apparatus or an apparatus to which an image pickup apparatus is externally connected, such as a personal computer (of a lap-top type, a desk-top type, a tablet-type, etc.) and a portable game player.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

This application claims the benefit of Japanese Patent Application No. 2015-200960 filed Oct. 9, 2015, which is hereby incorporated by reference herein in its entirety.

What is claimed is:

1. An image pickup apparatus comprising:
   an image sensor;
   an object detector configured to detect a specific object from a live view image picked up by said image sensor;
   a movement detector configured to detect movement of the image pickup apparatus;
   a memory; and
   at least one processor and/or at least one circuit to perform the operations of the following units:
   a zoom control unit configured to perform control such that a zoom operation is performed according to an amount of movement of the image pickup apparatus detected by said movement detector; and
   a control unit configured to perform control such that the zoom operation performed by said zoom control unit according to the amount of movement of the image pickup apparatus is restricted, in a case where predetermined conditions is satisfied which include a condition that a direction of the movement of the object detected by said object detector is the same as a direction of the movement of the image pickup apparatus detected by said movement detector.

2. The image pickup apparatus according to claim 1, wherein in a case where the predetermined conditions are satisfied, said control unit controls said zoom control unit not to perform a zoom operation according to the amount of movement of the image pickup apparatus.

3. The image pickup apparatus according to claim 1, wherein the memory and the at least one processor and/or the at least one circuit perform the operation of a determination unit configured to determine, based on a change in positional relationship between a main object detected by said object detector and another object, movement of the main object.

4. The image pickup apparatus according to claim 1, wherein the predetermined conditions further include a condition that an amount of movement of a main object detected by said object detector is not smaller than a predetermined value.

5. The image pickup apparatus according to claim 3, wherein the predetermined conditions further include a condition that a difference between an amount of movement of the main object detected by said object detector and the amount of movement of the image pickup apparatus detected by said movement detector is smaller than a threshold value.

6. The image pickup apparatus according to claim 1, wherein the predetermined conditions further include a condition that the image pickup apparatus is photographing a still image or a moving image.

7. The image pickup apparatus according to claim 1, wherein the predetermined conditions further include a condition that the image pickup apparatus is not in a photographing standby state.

8. The image pickup apparatus according to claim 1, wherein the predetermined conditions further include a condition that a zoom operation by a user's operation of an operation member is not being performed.

9. The image pickup apparatus according to claim 1, wherein in a case where movement of the image pickup apparatus, which is not smaller than a predetermined amount, is detected by said movement detector, and the predetermined conditions are not satisfied, said zoom control unit performs control such that a zoom-out operation is performed.

10. The image pickup apparatus according to claim 9, wherein in a case where the movement of the image pickup apparatus becomes not larger than a threshold value after performing the zoom-out operation, said zoom control unit performs control such that a zoom-in operation is performed until a zoom position before performing the zoom-out operation is reached.

11. The image pickup apparatus according to claim 9, wherein the zoom-out operation includes a zoom-out operation by optical zoom.

12. The image pickup apparatus according to claim 9, wherein the zoom-out operation includes a zoom-out operation by electronic zoom.

13. A method of controlling an image pickup apparatus including an image sensor, comprising:
   detecting a specific object from a live view image picked up by the image sensor;
   detecting movement of the image pickup apparatus;
   performing control such that a zoom operation is performed according to an amount of detected movement of the image pickup apparatus; and performing control such that the zoom operation according to the amount of detected movement of the image pickup apparatus is restricted, in a case where predetermined conditions are satisfied which include a condition that a direction of movement of the detected object is the same as a direction of the detected movement of the image pickup apparatus.

14. A non-transitory computer-readable storage medium storing a computer-executable program for executing a method of controlling an image pickup apparatus including an image sensor,
wherein the method comprises:
detecting a specific object from a live view image picked up by the image sensor;
detecting movement of the image pickup apparatus;
performing control such that a zoom operation is performed according to an amount of detected movement of the image pickup apparatus; and
performing control such that the zoom operation according to the amount of detected movement of the image pickup apparatus is restricted, in a case where predetermined conditions are satisfied which include a condition that a direction of movement of the detected object is the same as a direction of the detected movement of the image pickup apparatus.

15. An image pickup apparatus comprising:
an image sensor;
an object detector configured to detect a specific object from a live view image picked up by said image sensor;
a movement detector configured to detect movement of the image pickup apparatus;
a memory; and
at least one processor and/or at least one circuit to perform the operations of the following units:
a zoom control unit configured to perform control such that a zoom operation is performed according to an amount of movement of the image pickup apparatus detected by said movement detector; and
a control unit configured to perform control such that the zoom operation performed by said zoom control unit according to the amount of movement of the image pickup apparatus is restricted, in a case where predetermined conditions are satisfied which include a condition that a difference between an amount of movement of a main object detected by said object detector and the amount of movement of the image pickup apparatus detected by said movement detector is smaller than a threshold value.

16. A method of controlling an image pickup apparatus including an image sensor, comprising:
detecting a specific object from a live view image picked up by the image sensor;
detecting movement of the image pickup apparatus;
performing control such that a zoom operation is performed according to an amount of detected movement of the image pickup apparatus; and
performing control such that the zoom operation according to the amount of detected movement of the image pickup apparatus is restricted, in a case where predetermined conditions are satisfied which include a condition that a difference between an amount of detected movement of a main object and the amount of detected movement of the image pickup apparatus is smaller than a threshold value.

17. A non-transitory computer-readable storage medium storing a computer-executable program for executing a method of controlling an image pickup apparatus including an image sensor,
wherein the method comprises:
detecting a specific object from a live view image picked up by the image sensor;
detecting movement of the image pickup apparatus;
performing control such that a zoom operation is performed according to an amount of detected movement of the image pickup apparatus; and
performing control such that the zoom operation according to the amount of detected movement of the image pickup apparatus is restricted, in a case where predetermined conditions are satisfied which include a condition that a difference between an amount of detected movement of a main object and the amount of detected movement of the image pickup apparatus is smaller than a threshold value.

* * * * *